(12) United States Patent
Wu et al.

(10) Patent No.: US 12,447,133 B2
(45) Date of Patent: Oct. 21, 2025

(54) COMPOSITION AND DEVICE FOR PREVENTING HYPOGLYCEMIA AND USE THEREOF

(71) Applicant: THE GOVERNING COUNCIL OF THE UNIVERSITY OF TORONTO, Toronto (CA)

(72) Inventors: Xiao Yu Wu, Toronto (CA); Jason Li, Toronto (CA); Amin Ghavami Nejad, Toronto (CA); Brian Lu, Toronto (CA); Adria Giacca, Toronto (CA)

(73) Assignee: THE GOVERNING COUNCIL OF THE UNIVERSITY OF TORONTO, Toronto (CA)

( * ) Notice: Subject to any disclaimer, the term of this patent is extended or adjusted under 35 U.S.C. 154(b) by 1053 days.

(21) Appl. No.: 17/292,129

(22) PCT Filed: Nov. 8, 2019

(86) PCT No.: PCT/CA2019/051600
§ 371 (c)(1),
(2) Date: May 7, 2021

(87) PCT Pub. No.: WO2020/093173
PCT Pub. Date: May 14, 2020

(65) Prior Publication Data
US 2021/0393543 A1 Dec. 23, 2021

Related U.S. Application Data

(60) Provisional application No. 62/757,677, filed on Nov. 8, 2018.

(51) Int. Cl.
*A61K 9/70* (2006.01)
*A61K 9/00* (2006.01)
*A61K 38/26* (2006.01)
*A61P 3/10* (2006.01)
*C08J 3/075* (2006.01)

(52) U.S. Cl.
CPC .......... *A61K 9/7023* (2013.01); *A61K 9/0021* (2013.01); *A61K 38/26* (2013.01); *A61P 3/10* (2018.01); *C08J 3/075* (2013.01)

(58) Field of Classification Search
None
See application file for complete search history.

(56) References Cited

U.S. PATENT DOCUMENTS

| | | | |
|---|---|---|---|
| 2002/0013804 A1 | 1/2002 | Gideon | |
| 2009/0156460 A1* | 6/2009 | Jiang | C08F 220/36 514/772.3 |
| 2016/0252505 A1* | 9/2016 | Braun | G01N 33/66 436/501 |
| 2018/0015379 A1 | 1/2018 | Pratt | |
| 2021/0012873 A1 | 1/2021 | Norman | |
| 2021/0128738 A1* | 5/2021 | Gu | A61P 3/10 |

FOREIGN PATENT DOCUMENTS

| | | | |
|---|---|---|---|
| CN | 103110956 A | 5/2013 | |
| CN | 104586752 A | 5/2015 | |
| WO | 20060044063 A2 | 4/2006 | |
| WO | 2006102762 A1 | 10/2006 | |
| WO | 20130123492 A1 | 8/2013 | |
| WO | 20170143153 A1 | 8/2017 | |
| WO | 20180165294 A1 | 9/2018 | |
| WO | WO-2018165294 A1 * | 9/2018 | ............. A61K 38/26 |
| WO | 2019126753 A1 | 6/2019 | |

OTHER PUBLICATIONS

Yu J, Stimuli responsive delivery of therapeutics for diabetes treatment, Bioengineering and Translational Medicine, 2016, 1:323-337 (Year: 2016).*
Stanford Medicine; (https://www.stanfordchildrens.org/en/topic/default?id=hypoglycemia-in-children-90-P01960) (Year: 2014).*
Jicheng Yu et al: "Stimuli-responsive delivery of therapeutics for diabetes treatment", Bioengineering & Translational Medicine, vol. 1, No. 3, Sep. 1, 2016 (Sep. 1, 2016), pp. 323-337, XP055408881, ISSN: 2380-6761, DOI: 10.1002/btm2.10036.
Ghavaminejad Amin et al: "Glucose-Responsive Composite Microneedle Patch for Hypoglycemia-Triggered Delivery of Native Glucagon", Advanced Materials, Jun. 5, 2019 (Jun. 5, 2019), p. 1901051, XP055932675, DE , ISSN: 0935-9648, DOI: 10.1002/adma.201901051. Retrieved from the Internet: URL:https://onlinelibrary.wiley.com/doi/full-XML/10.1002/adma.201901051.
Wei Wang, et al., "Ultrastable core-shell structured nanoparticles directly made from zwitterionic polymers", ChemComm, 2014, 50, pp. 15030-15033.
Peng Zhang, et al., "Zwitterionic gel encapsulation promotes protein stability, enhances pharmacokinetics, and reduces immunogenicity", Pnas, 112, 39, Sep. 29, 2015, pp. 12046-12051.
Zahoor H. Farooqi, et al., "Engineering of Phenylboronic Acid Based Glucose-Sensitive Microgels with 4-Vinylpyridine for Working at Physiological pH and Temperature", Macromolecular Chemistry and Physics, 2011, 212, pp. 1510-1514.

(Continued)

Primary Examiner — Celeste A Roney
(74) Attorney, Agent, or Firm — HILL & SCHUMACHER

(57) ABSTRACT

A composition for preventing or treating hypoglycemia in a patient in need thereof has a microgel that includes cross-linked polymers containing glucose-responsive moieties; and blood glucose-raising therapeutic agent loaded on or within the microgel. The microgel further includes any one or a combination of a stabilizing component and a loading-assisting component for the blood glucose-raising therapeutic agent. The polymers containing the glucose-responsive moieties form secondary crosslinks in response to low glucose level, thereby causing shrinking of the microgel and rapid release of the blood glucose-raising therapeutic agent. The composition can be used to prepare a composite microneedle patch for preventing or treating hypoglycemia, where the composition is embedded or integrated within an array of the microneedles of the microneedle patch device.

18 Claims, 20 Drawing Sheets

(56) References Cited

OTHER PUBLICATIONS

Qingshi Wu et al., "Bioinspired synthesis of poly(phenylboronic acid) microgels with high glucose selectivity at physiological pH†", Polymer Chemistry, 2016, 7, pp. 6500-6512.
Mohammad Vatankhah-Varnoosfaderani, et al., "Well-Defined Zwitterionic Microgels: Synthesis and Application as Acid-Resistant Microreactors", Macromolecules, 2016, 49, pp. 7204-7210.
Jicheng Yu, et al., "Insulin-Responsive Glucagon Delivery for Prevention of Hypoglycemia", Advanced Science News, 2017, 14, 5 pages.
Eugenia Palylyk-Colwell, et al., "A Transdermal Glucagon Patch for Severe Hypoglycemia", CADTH, Jun. 2017, 7 pages.
International Search Report and Written Opinion, PCT/CA2019/051600, Jan. 30, 2020, 10 pages.

\* cited by examiner

COMPOSITION AND DEVICE FOR PREVENTING HYPOGLYCEMIA AND USE THEREOF

CROSS-REFERENCE TO RELATED APPLICATIONS

This application is a National Phase of PCT Application No. PCT/CA2019/051600, filed on Nov. 8, 2019, and published on May 14, 2020 as WO 2020/093173, in English, which claims priority to U.S. Provisional Patent Application No. 62/757,677, filed on Nov. 8, 2018, all of which are incorporated herein by reference in their entirety.

FIELD

This present disclosure generally relates to a composition and its use for preventing or treating hypoglycemia. More specifically, the disclosure relates to a composition and device that comprises a polymeric system containing glucose-responsive moieties, blood glucose-raising therapeutic agents and any one or a combination of a stabilizing component and a loading-assisting component for the blood glucose-raising therapeutic agent.

BACKGROUND

Diabetes is a group of metabolic diseases characterized by hyperglycemia that affects 422 million people worldwide (Rice et al., 2016, Ye et al., 2016, Groop and Pociot, 2014, Wang et al., 2017, Gordijo et al., 2010). In the United States, approximately 29 million people have diabetes, or roughly 9% of the total population. An estimated 10% of all diabetic patients have type 1 diabetes in which insulin-producing pancreatic β-cells are destroyed and glucagon secretion from pancreatic α-cells is impaired. These patients require life-long treatment with exogenous insulin to maintain euglycemia and for survival. However, the use of insulin therapy is not without risk. Over-estimation of daily insulin requirements and administration of excess insulin can cause acute hypoglycemia, a life-threatening condition of abnormally low blood glucose levels (<70 mg/dL) (Gordijo et al., 2011, Chu et al., 2012, Swinnen et al., 2009, Wang et al., 2016).

Hypoglycemia is the most serious acute complication associated with insulin therapy in diabetic patients and the limiting factor of intensive insulin treatment. Patients are particularly susceptible to episodes of nocturnal hypoglycemia due to delayed action of exogenously administered insulin before sleep. Furthermore, adherence to tight blood glucose targets are often relaxed for operators of motor vehicles to mitigate the risk of hypoglycemic episodes while driving, resulting in long-term complications associated with hyperglycemia (Lorber et al., 2012). The problem of hypoglycemia is particularly difficult in type 1 diabetes because counter-regulation is impaired. In the normal response to hypoglycemia, insulin secretion is suppressed and the release of counter-regulatory hormones, including glucagon, act to restore normal blood glucose levels. However, in type 1 diabetes, hypoglycemia cannot decrease insulin release to the blood because insulin is supplied exogenously and glucagon release from pancreatic α-cells, which is normally triggered by decreased endogenous insulin release, is impaired.

Severe cases of hypoglycemia are currently treated by emergency glucagon injections sold by Novo Nordisk (GlucaGen® KypoKit®) and Eli Lilly (glucagon for injection). Due to the physical instability of solubilized glucagon, the products exist as a dry powder that requires the patient or caregiver to first dissolve the glucagon prior to administration. Glucagon formulations that are stable in solution are currently in clinical trials (e.g., Zealand Pharma's glucagon analog Dasiglucagon and Xeris Pharmaceuticals' stable liquid formulation of glucagon). However, such emergency/rescue injections still require significant patient intervention, which can be challenging for patient populations that suffer from hypoglycemia-unawareness, nocturnal hypoglycemia, and patients who rely on caregivers or parents for treatment. Recently, Zosano Pharma has developed a metallic microneedle patch for transdermal delivery of glucagon. Such a system may offer better comfort and compliance, however, application of the rescue patch still requires patient intervention or risk of hyperglycemia—a problem that is intrinsically associated with any non-glucose responsive glucagon treatment or rescue options.

A solution that does not require substantial patient intervention is a preventative technology designed to deliver glucagon exclusively during hypoglycemia. Recently, researchers have developed an insulin-responsive microneedle patch that releases glucagon in response to high levels of plasma insulin (Gu and Yu 2017). However, this system is responsive to hyperinsulinemia rather than hypoglycemia, therefore its clinical usefulness is limited because hyperinsulinemia can result from a variety of metabolic diseases and conditions (e.g. type 2 diabetes, drug-induced hyperinsulinemia, congenital hyperinsulinism, hypertension, obesity, dyslipidemia, glucose intolerance, etc.). As such, this system can only protect against insulin-induced hypoglycemia, which is not the sole cause of hypoglycemia. Other causes include skipping meals or fasting, exercising, excessive intake of insulin sensitizers, and excessive alcohol consumption.

There remains a need to develop a glucose-responsive device that can prevent hypoglycemia.

SUMMARY

The present disclosure provides a composition and device for delivery of blood glucose-raising agents such as glucagon or PRL-2903.

In one aspect, the disclosure is directed to a composition for preventing or treating hypoglycemia comprising: a microgel comprising crosslinked polymers containing glucose-responsive moieties; and blood glucose-raising therapeutic agent loaded on or within the microgel, wherein the microgel further comprises any one or a combination of a stabilizing component and a loading-assisting component for the blood glucose-raising therapeutic agent.

The polymers containing the glucose-responsive moieties form secondary crosslinks in response to low glucose level, thereby causing shrinking of the microgel and rapid release of the blood glucose-raising therapeutic agent.

In an embodiment, the glucose-responsive moieties are any one or a combination of a boronic acid-containing compound, glucose oxidase, and lectin.

The boronic acid-containing compound may be a polymer containing any one or a combination of 4-mercaptophenylboronic acid, phenylboronic acid, 3-alkylamidophenylboronic acid, 4-carboxyphenylboronic acid, 4-acetamido-3-fluorophenylboronic acid, 2-hydroxymethylphenylboronic acid (benzoboroxole), 4-nitrophenylboronic acid, 3-acetamido-6-heptafluoropropylphenylboronic acid, 4-vinylphenylboronic acid, 3-acrylamidophenylboronic acid, 4-(1,6-dioxo-2,5-diaza-7-oxamyl)phenylboronic acid, 2-dimethylaminomethyl-5-vinylphenylboronic acid, 4-(N-allylsulfamoyl)phenylboronic acid, 4-(3-butenylsulfonyl)phenylboronic acid and 4-acrylamido-3-fluorophenylboronic acid (AFBA).

In one embodiment, the boronic acid-containing compound is AFBA (acrylamido-3-fluorophenylboronic acid).

In one embodiment, the lectin may be Concanavalin A.

The stabilizing component protects the therapeutic agent during loading onto and release from the microgels, and during the manufacturing of a device having the microgels embedded or integrated, and storage and clinical applications of the device.

In an embodiment, the stabilizing component is comprised of a polymer selected from the group consisting of one or more biocompatible synthetic, semisynthetic and/or natural polymers that stabilize the native structure and bioactivity of the therapeutic agent.

The polymer may be selected from the group consisting of poly(vinyl alcohol), polysaccharides and derivatives, poly(ethylene glycol), hydroxypropyl-β-cyclodextrin, glycopolymers containing trehalose, PVP, Ficoll-70000, hydroxyethyl (heta) starch, PEG 4000, functionalized dextrans, zwitterionic-based polymers, polymers of N-(methacryloxypropyl)-N,N-dimethyl-N-(3-sulfopropyl) ammonium betaine (SBMA), and cationic carboxybetaine (CB).

In an embodiment, the zwitterionic-based polymers are zwitterionic polymers bearing carboxybetaine and sulfobetaine.

In an embodiment, the loading-assisting component may be selected from the group consisting of (2-carboxymethyl)-3 acrylamidopropyldimethylammonium bromide methyl ester, (4-carboxypropyl)-3-acrylamidopropyldimethylammonium bromide ethyl ester, (6-carboxypentyl)-3-acrylamidopropyldimethylammonium bromide ethyl ester, 3-acrylamido-N-(2-methoxy-2-oxoethyl)-N,N-dimethylpropan-1-aminium, 3-methacrylamido-N-(2-methoxy-2-oxoethyl)-N,N-dimethylpropan-1-aminium 2-Carboxy-N,N,-dimethyl-N-(2'-(methacryloyloxy)ethyl) ethanaminium inner salt and 3-[2-(Methacryloyloxy)ethyl]dimethylammonio] propionate.

The polymer of the loading-assisting component may have an opposite ionic charge with respect to therapeutic agent at selected pH and is converted to zwitterionic form after hydrolysis.

The therapeutic agent may be a polypeptide that counter-regulates hypoglycemia.

In an embodiment, the therapeutic agent is glucagon or glucagon analogue.

In another embodiment, the therapeutic agent may be PRL-2903.

The monomer units in the polymers of the microgel can be crosslinked with physical or chemical linkages that are biodegradable or non-degradable.

In an embodiment, the cross-linkages may be selected from group of N,N'-Methylenbis-acrylamide (MBA), dimethylsubermidate, glutaraldehyde, N,N-ethylene-bis (iodoacetamide), ethylene glycol dimethacrylate (EGDM), poly(ε-caprolactone) diacrylate, polylactide diacrylate, polylactide dimethacrylate, poly(lactide-co-glycolide) diacrylate, poly(lactide-co-glycolide) dimethacrylate, poly(ε-caprolactone-b-ethylene glycol-b-ε-caprolactone) diacrylate, glycol-b-(lactide-co-glycolide)] dimethacrylate, and polymerizable compounds containing disulfide bonds, peptide bonds, or ester bonds.

In one embodiment, monomer units in the polymers are crosslinked with N,N'-methylenebisacrylamide.

In an embodiment of the present disclosure, the microgel may be a multifunctional microgel having a particle size of about 20 nm to 1000 μm. In an embodiment, the microgel may have a particle size of 100 nm to 50 μm.

In an embodiment, the blood glucose-raising therapeutic agent may be loaded by dissolving, dispersing, entrapping, or encapsulating within, or attachment on the glucose-responsive microgels.

In an embodiment, the microgel composition according to the present disclosure is for administration to a patient by subcutaneous injection.

In another embodiment, the composition according to the present disclosure can be applied to a patient by a microneedle patch device having an array of microneedles.

The microneedles of the microneedle patch device may be prepared from non-swellable, swellable, dissolvable, or biodegradable polymeric materials.

In an embodiment, the polymeric materials may be selected from natural, synthetic, or semi-synthetic polymers.

The non-limiting examples of the polymeric materials may be selected from the group consisting of gums, polysaccharides, polysaccharide derivatives, alginates, chitosan, chitosan derivatives, poly(vinylpyrrolidone), Ficoll-70000, hydroxyethyl (heta) starch, poly(ethylene glycol), functionalized dextrans, glycopolymers containing trehalose, polyN-(methacryloxypropyl)-N,N-dimethyl-N-(3-sulfopropyl) ammonium betaine (PSBMA), hyaluronic acid, methacrylated hyaluronic acid, poly(methyl vinyl ether), poly(methyl vinyl ether-alt-maleic anhydride), poly(lactic acid), polyglycolide, poly(lactic-co-glycolic acid), polycarbonate, poly (vinyl alcohol), poly(hydroxyethylmethacrylate), poly(vinylpyrrolidone), zwitterionic carboxybetaine, (2-carboxymethyl)-3-acrylamidopropyldimethylammonium bromide, (2-carboxymethyl)-3-acrylamidopropyldimethylammoniumbromide-co-hydroxyethylmethacrylate, (2-carboxymethyl)-3-acrylamidopropyldimethylammonium bromide-co-acrylamide and methacrylated (2-carboxymethyl)-3-acrylamidopropyldimethylammonium bromide-co-acrylamide.

In an embodiment, the microneedle patch may be for application to a patient's transdermal tissue.

In one embodiment, the device comprises a composite microneedle transdermal patch designed to deliver blood glucose-raising agents in response to low levels of blood glucose to prevent or treat the occurrence and progression of hypoglycemia in diabetic patients.

The device may comprise a drug-loaded glucose-responsive microgel composition embedded within an array of microneedles fabricated from biocompatible polymers. Suitable polymers for use with the disclosure include hyaluronic acid (HA) and poly(methyl vinyl ether-co-maleic acid anhydride) (PMVE-MAH). The microgels may serve as an artificial pancreas to effectively release encapsulated drug (e.g. glucagon) in a glucose-responsive manner. In one embodiment, the microgels contain a glucose-sensitive moiety, such as boronic acid-containing compounds bearing various polymerizable groups including (meth)acrylates, (meth)acrylamides and styrenics.

Therapeutic agents can be encapsulated in microgels in order to adjust the release rate. The polymer contains boronic acid units that can cause shrinkage of the microgel due to stoichiometry-driven formation of bis-complexation between glucose and boronic acid functional groups. Owing to this shrinkage (squeezing), the loaded therapeutic agents can be rapidly released from the composite MN system to successfully prevent or treat incidences of hypoglycemia.

In an embodiment, the microgel may additionally contain a stabilizer compound that can protect the therapeutic agents (for example, glucagon or other unstable peptide hormone)

from degradation during the loading and releasing process. In one embodiment, the stabilizing compound is N-(methacryloxypropyl)-N,N-dimethyl-N-(3-sulfopropyl) ammonium betaine (SBMA). The preserved stability of the therapeutic agents within the microgel could be due to the super-hydrophilicity of a stabilizer, which have a tendency to recruit a large amount of non-altered hydrogen-bonds from water molecules to hydrate the core of the peptide upon unfolding.

In some embodiments, the microgels may be prepared via free radical polymerization. The polymerization can be initiated with a free radical initiator, such as ammonium persulfate (APS) and catalyzed with tetramethylethylenediamine (TMEDA or TEMED). Other free radical initiators can also be used. Choosing a suitable solvent is of crucial importance for this system, and a water-ethanol mixture was found to be a good solvent system because it could dissolve all polymerization components. The specific ratio of water:ethanol in the solvent system is also important. Likewise, the ratio of specific comonomers (e.g. stabilizing group, glucose-responsive monomer, crosslinker, etc.) in the composition of the microgel was rationally selected for the optimal glucose-responsive release profile since the proper composition is paramount to achieving desirable and clinically relevant delivery profiles for the effective prevention of hypoglycemia. It is also worth noting that too high or low of a glucose-responsive monomer content may change the glucose-responsive profile, which is not desirable. Thus, finding the critical composition to obtain the desirable glucose-responsive profile was an important and necessary achievement.

These and other aspects of the present disclosure will become clearer upon review of the detailed description of the disclosure in conjunction with the drawing briefly described below. It should be understood, however, that the detailed description and the specific examples, while indicating preferred embodiments of the disclosure, are given by way of illustration only, since various modifications and changes within the spirit and scope of the disclosure will become apparent to those skilled in the art from this detailed description.

DETAILED DESCRIPTION

Definitions

Figure 1:
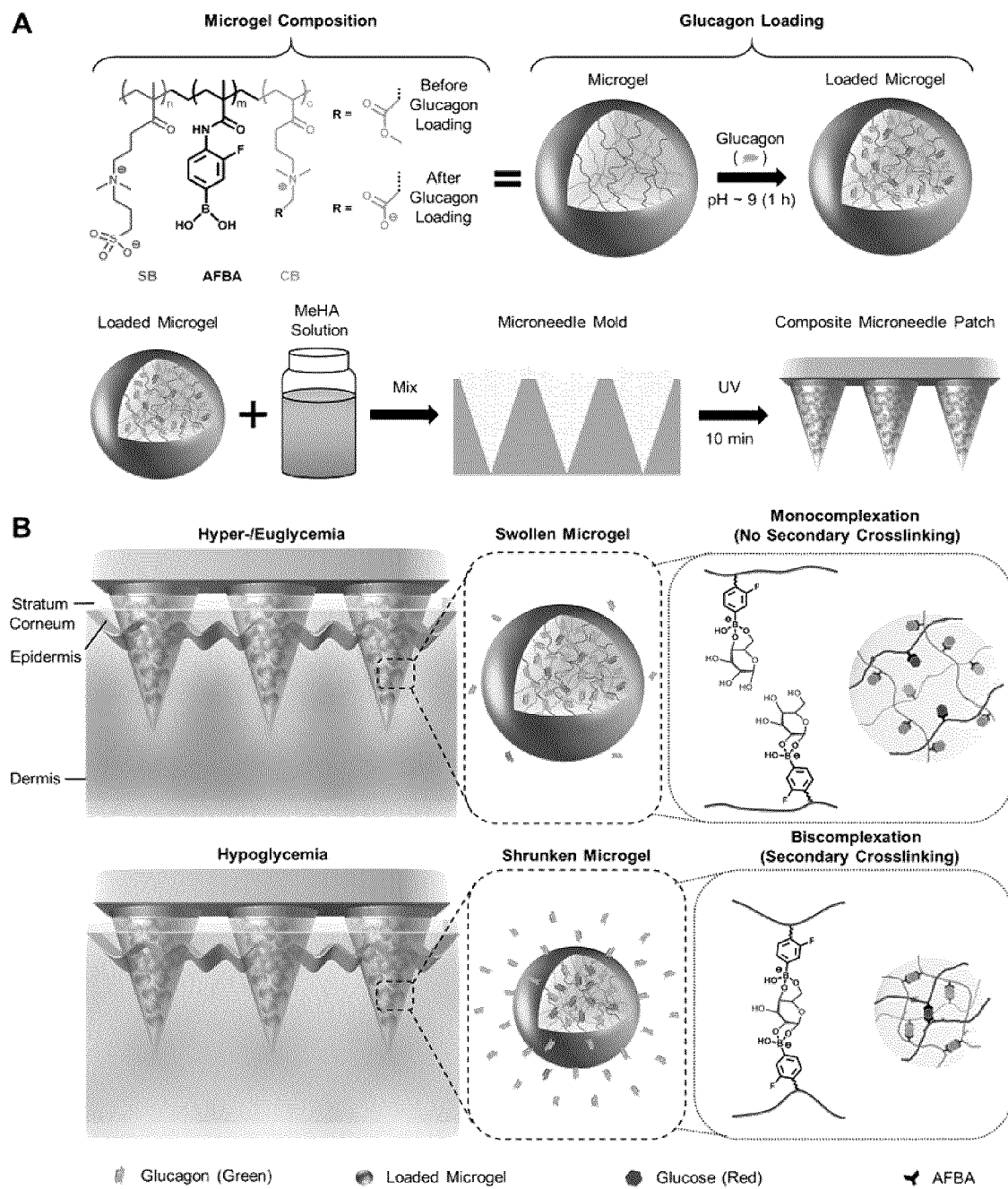
FIG. 1 illustrates: (A) composition of glucose-responsive microgels before and after blood glucose-raising hormone (glucagon) loading under alkaline conditions and provides a schematic of the composite MN fabrication process, and (B) schematic of the relatively slow glucagon release from the composite MN patch during hyper-/euglycemia due to diffusion mechanism caused by swelling versus the rapid release of glucagon during hypoglycemia due to low glucose-induced squeezing mechanism.

"Biocompatible" as used herein, generally refers to a material and any metabolites or degradation products thereof that are generally non-toxic to the subject and do not cause any significant adverse effects to the subject. "Hydrogel" refers to a material formed when an organic polymer (natural or synthetic) is crosslinked via covalent, ionic, or hydrogen bonds to create a three-dimensional open-lattice structure which entraps water molecules to form a gel. Biocompatible hydrogel refers to a water-absorbing polymeric gel which is not toxic to living cells, and allows sufficient diffusion of oxygen and nutrients to the entrapped cells to maintain viability.

"Microgel" as used herein, refers to micron-sized hydrogel particles or microparticles of any shape, composed of covalently crosslinked polymeric networks, having an average diameter of about 20 nm to 1000 μm, preferably, 100 nm to 50 μm "Microgels" are used interchangeably herein with "microparticles", to refer to particles within the disclosed size range, made of a covalently crosslinked polymeric network (i.e., gel).

"Drug-loaded microgels" refers to a microgel having a drug (e.g. glucose-raising agents such as glucagon) dissolved, dispersed, entrapped, encapsulated, or attached to, on, or within the microgel.

"Hypoglycemia" refers to the low blood glucose concentrations, typically bellow 70 mg/dL.

"Hyperglycemia" refers to the high blood glucose concentrations, typically above 145 mg/dL before meals, and above 180 mg/dL after meals.

"Euglycemia" refers to the maintenance of blood glucose concentrations at a desired (healthy) level, typically between 70-145 mg/dL before meals, and between 90-180 mg/dL after meals.

"BGL" refers to the blood glucose levels.

"Therapeutic agent" as used herein refers to any molecules, such as hormone peptide or polypeptide molecules that counter-regulates hypoglycemia.

"Hormones" refers to signaling molecules secreted from glands of the endocrine system that act on distant target organs in the body for the regulation of physiology and/or behavior (e.g., insulin secreted from beta-cells of the pancreas for the regulation of blood glucose). Hormones may be peptides or polypeptides, such as insulin, glucagon, and somatostatin.

"Polypeptide" refers to a biomolecule that is comprised of amino acids. Peptides with a long sequence of amino acids that may permit the formation of secondary and tertiary structures may be considered proteins.

"Zwitterionic" refers to a polymer, small molecule, or chemical moiety with a positive and a negative charge or with equal positive and negative charges.

"Monodisperse" is used herein to describe a population of particles where all the particles are the same or nearly the same size, i.e., a uniform distribution. For example, "monodisperse" refers to particle distributions in which 90% of the distribution lies within 15% of the median particle size, more preferably within 10% of the median particle size, most preferably within 5% of the median particle size.

"Microneedle (MN) Patch" is an array of three-dimensional micron-scaled needle-like projections with lengths usually less than 1000 μm (Moronkeji et al., 2017). MNs are designed to penetrate the surface layer of the epidermis and can be designed with different needle lengths to reach the appropriate depth without coming in contact with nerves in the underlying dermis that may otherwise induce pain and damage blood vessels.

Compositions

Drug-loaded glucose-responsive microgels designed to facilitate delivery of blood glucose-raising agents in response to low blood glucose are composed of three comonomers, a crosslinking agent, and a blood glucose-raising therapeutic agent (e.g., polypeptide hormones, such as glucagon or polypeptide, such as receptor antagonists) (see FIG. 1A). Glucose-responsiveness is made possible by the inclusion of a glucose-sensing monomer along the polymer chain of the microgel that can bind glucose molecules and facilitate the swelling or shrinking of the glucagon-loaded microgel. At high glucose concentrations (e.g. 200 mg/dL), all glucose-sensing monomers are saturated with glucose with a binding mole ratio of 1:1, known as mono-complexation, which results in the swelling of the glucagon-loaded microgel. In the swollen state, glucagon release from the microgel is driven only by diffusion and is rather slow. At low glucose concentrations (e.g. 70 mg/dL), glucose-sensing monomers are forced to share the limited number of glucose molecules and bind in a mole ratio of 2:1, known as bis-complexation, which forces the polymer chains of the microgel to form secondary crosslinks (see FIG. 1B). Formation of secondary crosslinks driven by the reduction in glucose level results in the shrinking (or squeezing) of the microgel and thus, rapid release of blood glucose-raising agent from the microgel. Taken together, the glucagon-loaded glucose-responsive microgel system is capable of rapidly delivering glucagon at low glucose levels or hypoglycemia (e.g. ≤70 mg/dL) and delaying the release of glucagon at high glucose levels or hyperglycemia (e.g. ≥180 mg/dL), which is desirable for the prevention of hypoglycemia in insulin-dependent diabetic patients.

Delivery rates at both the hypoglycemic and hyperglycemic conditions can be tuned by changing the content of the glucose-sensing monomer, crosslinking agent, and/or size of the microgel. Likewise, the amount of therapeutic agent delivered can also be tuned by changing the drug loading capacity, which is done by altering the content of the drug-loading monomer, and/or size of the microgel. In the preferred embodiment for glucagon, the glucagon loading capacity is 1-99%, more preferably 10-90%, and more preferably 20-30%.

The dosage form for the delivery of glucagon (or other blood glucose-raising therapeutic) from the glucose-responsive microgels can be that of a biocompatible hydrogel microneedle transdermal patch. The microneedle patch was chosen for its ease of application, controllable delivery, and applicability for providing preventative therapy against cases of hypoglycemia such as, nocturnal hypoglycemia and hypoglycemia during driving or operation of machinery. Herein, a composite microneedle patch is described and is composed of the glucagon-loaded glucose-responsive microgels embedded within the matrix of a hydrogel-based microneedle patch. However, other methods can be used for the delivery of the microgel composition according the present disclosure, for example, by subcutaneous injection Microgels An exemplary microgel is shown in FIG. 1. The microgels contain four components: (1) a stabilizing component fora blood glucose-raising therapeutic agent; (2) a glucose-responsive moiety; (3) a drug loading-assisting component; and (4) the blood glucose-raising therapeutic agent, for example, peptide hormone (drug). The microgel regulates the rate of therapeutic agent release in response to glucose concentration. In particular embodiments, the microgels expand at high glucose concentration (200 mg/dL) and shrink substantially in low glucose environments (70 mg/dL). In some embodiments, the polymer contains boronic acid units that can cause shrinkage of the microgel due to stoichiometry-driven formation of bis-complexation between glucose and boronic acid functional groups. Owing to this shrinkage (squeezing), the loaded therapeutic agent is rapidly released from the composite MN system to successfully prevent or treat incidences of hypoglycemia.

The stabilizer component may be biocompatible, synthetic, natural polymers or a combination thereof, suitable for the stabilization of the native structure of the therapeutic agent, such as peptide hormone, and which does not change the mechanical strength of the composite microneedle patch. Examples of such polymeric systems include, but are not limited to, neutral (non-ionic) polymers (e.g. PVP, Ficoll-70000, and hydroxyethyl (heta) starch), or PEG 4000, and semi-synthetic polymers, such as functionalized dextrans and glycopolymers containing trehalose, or zwitterionic-based polymers, such as polymers of N-(methacryloxypropyl)-N,N-dimethyl-N-(3-sulfopropyl) ammonium betaine (SBMA), polymers of cationic carboxybetaine (CB) and derivatives, poly(vinyl alcohol), polysaccharides and derivatives, poly(ethylene glycol), and hydroxypropyl-β-cyclodextrin.

The N-(methacryloxypropyl)-N,N-dimethyl-N-(3-sulfopropyl) ammonium betaine (SBMA) content may vary between about 70 to 80 wt % with respect to the total monomer concentration. Preferably, the SBMA concentration could be about 72-78 wt %, more preferably 73-77% by weight, and more preferably 74-76% by weight in comparison to the total monomer concentration.

The cationic carboxybetaine (CB) content may vary between about 2 to 10 wt % with respect to the total monomer concentration. Preferably, the CB concentration could be about 4-6 wt %, more preferably 4.5-5.5 wt %, and more preferably 5% by weight in comparison to the total monomer concentration.

The loading-assisting component may be (2-carboxymethyl)-3 acrylamidopropyldimethylammonium bromide methyl ester, (4-carboxypropyl)-3-acrylamidopropyldimethylammonium bromide ethyl ester, (6-carboxypentyl)-3-acrylamidopropyldimethylammonium bromide ethyl ester, 3-acrylamido-N-(2-methoxy-2-oxoethyl)-N,N-dimethylpropan-1-aminium, 3-methacrylamido-N-(2-methoxy-2-oxoethyl)-N,N-dimethylpropan-1-aminium 2-Carboxy-N,N,-dimethyl-N-(2'-(methacryloyloxy)ethyl) ethanaminium inner salt or 3-[2-(Methacryloyloxy)ethyl]dimethylammonio]propionate.

The microgels function by releasing the therapeutic agent from the composite MN patch in response to low glucose concentrations and thus, to prevent or treat hypoglycemia. Therefore, integration of the glucose-responsive moieties in the microgels is important to the continuous sensing of glucose in real-time and performing automatic adjustment of hormone release rate. As such, the microgel contains a glucose-responsive moiety. In particular embodiments, the glucose-responsive moiety is a glucose-sensing molecule, such as glucose oxidase (GOx), lectin (e.g. Concanavalin A), or boronic acid containing compounds. In more particular embodiments, the glucose-responsive moieties can be synthetic phenylboronic acid (PBA) or boronic acid containing compounds bearing various polymerizable groups including (meth)acrylates, (meth)acrylamides and styrenics. Examples of such monomers include, but are not limited to, 4-mercaptophenylboronic acid, phenylboronic acid, 3-alkylamidophenylboronic acid, 4 carboxyphenylboronic acid, 4-acetamido-3-fluorophenylboronic acid, 2-hydroxymethylphenylboronic acid (benzoboroxole), 4-nitrophenylboronic acid, 3-acetamido-6-heptafluoropropylphenylboronic acid, 4-vinylphenylboronic acid, 3-acrylamidophenylboronic acid, 4-(1,6-dioxo-2,5-diaza-7-oxamyl)phenylboronic acid, 2-dimethylaminomethyl-5-vinylphenylboronic acid, 4-(N allylsulfamoyl) phenylboronic acid, 4-(3-butenylsulfonyl)phenylboronic acid, 3-(acrylamido)-phenylboronic acid (ABA) and 4-Acrylamido-3-fluorophenylboronic acid (AFBA).

Figure 2:
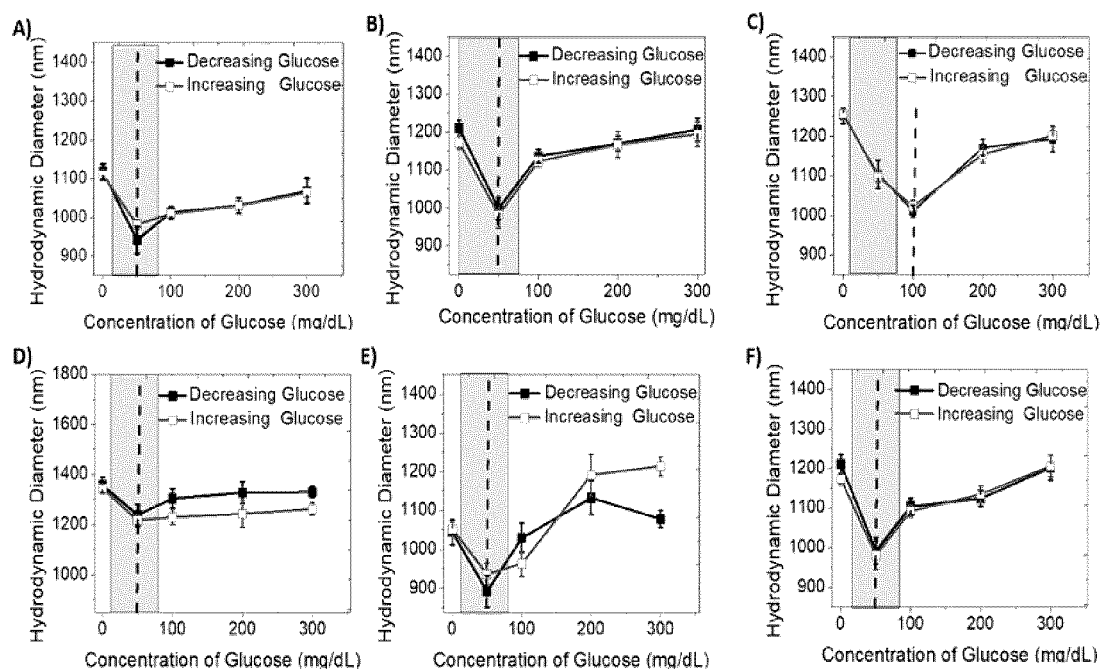
FIG. 2 is a series of graphs illustrating the dynamic light scattering (DLS) results of microgels with different compositions at different glucose concentrations (critical point and hypoglycemic area shown by dashed lines and yellow boxes, respectively).

The concentration of glucose-responsive monomer can affect the properties of the microgels, such as glucose-responsiveness, size and drug release rate. Microgels with higher glucose-responsive monomer content are larger in size and exhibited a higher glucose transition point (critical point), defined as the glucose concentration with maximum volume reduction (FIG. 2). It is also worth noting that too high or low of a glucose-responsive monomer content can drastically change the glucose-responsive profile. For example, the existence of high concentration of glucose-responsive monomer could provide an anti-hyperglycemic effect after subcutaneous injection into STZ-induced type 1 diabetic male rats. It is also expected that this polymeric system could prevent hypoglycemia if injected prior to a high dose of insulin due to its ability of storing/releasing glucose at high/low blood glucose concentrations, respectively.

The concentration of glucose-responsive monomer, such as 4-Acrylamido-3-fluorophenylboronic acid (AFBA), may vary between about 10 to 40 wt %. Preferably, this concentration could be about 10-20 wt %, more preferably 14-16 wt %, and more preferably 14.5-15.5 wt % with respect to the total monomer concentration.

The incorporation of glucose-responsive co-monomers, such as AFBA, within microgels composed of peptide stabilizing groups, such as the super-hydrophilic SBMA or CB, is a challenge for dispersion polymerization due to the difference in their hydrophilicity. Choosing a suitable solvent is of crucial importance for this system, and a water-in-ethanol mixture was found to be a good solvent because it could dissolve all the polymerization components. The specific ratio of water-ethanol in the system is also important. Higher ethanol fraction results in increasing particle size due to the faster nucleation. Lower ethanol fraction results in uncontrolled polymerization. The specific ratio of water-ethanol may vary between 20-40 wt % water to 60-80 wt % ethanol. Preferably, the specific ratio of water-ethanol could be about 25-35 wt % water to 65-75 wt % ethanol, more preferably 30 wt % water to 70 wt % ethanol.

Crosslinking density can also affect the properties of the microgels, such as mechanical strength, swelling and drug release. The crosslinking reaction is mainly influenced by the type and amount of crosslinking agent (crosslinker). The smaller the size of the crosslinker, typically the faster the crosslinking reaction, since diffusion is easier and more rapid. Higher crosslinker content exhibited increased hysteresis. Crosslinker content may vary between about 1 to 10 wt %. Preferably, the crosslinker concentration could be about 1-5 wt %, more preferably 1-4 wt %, and more preferably 1-2 wt % with respect to the total monomer concentration. Non-limiting examples of the crosslinking agents that may be used include: N,N'-Methylenbis-acrylamide (MBA), dimethylsubermidate, glutaraldehyde, N,N-ethylene-bis (iodoacetamide), ethylene glycol dimethacrylate (EGDM), poly(ε-caprolactone) diacrylate, polylactide diacrylate, polylactide dimethacrylate, poly(lactide-co-glycolide) diacrylate, poly(lactide-co-glycolide) dimethacrylate, poly(ε-caprolactone-b-ethylene glycol-b-ε-caprolactone) diacrylate, glycol-b-(lactide-co-glycolide)] dimethacrylate, and polymerizable compounds containing disulfide bonds, peptide bonds, or ester bonds.

Blood Glucose-Raising Agents (Therapeutic Peptide Hormones)

Therapeutic hormones which have the effect of elevating blood glucose are known in the art and are preferably peptides, for example, glucagon and PRL-2903. Glucagon is a polypeptide consisting of a single chain of 29 amino acids, with a molecular weight of 3483 Daltons. Glucagon is a highly-conserved peptide hormone, synthesized in the pancreas and secreted from alpha cells in response to hypoglycemia. Secreted glucagon acts on the liver to convert stored glycogen into glucose (i.e. glycogenolysis), which is released into the bloodstream to raise blood glucose. Glucagon can also cause the liver and kidneys to perform gluconeogenesis (synthesis of additional glucose) should the glycogen stores of the liver become depleted. In type 1 diabetes, glucagon secretion from alpha cells is impaired, partially due to excessive levels of the peptide hormone, somatostatin, which has an inhibitory effect on glucagon secretion. Thus, exogenous glucagon (recombinant origin) is required for type 1 diabetics suffering from severe cases of hypoglycemia. Recombinant glucagon can be expressed in E. coli and purified to at least 95% pure prior to use. Glucagon can also be chemically produced by solid-phase peptide synthesis. Multiple commercial sources are available. In the preferred embodiment, the concentration range of glucagon is 0.5-5 mg/mL, more preferably 0.8-1.5 mg/mL, and more preferably 1 mg/mL.

PRL-2903 is an experimental synthetic peptide therapeutic, and more specifically, a somatostatin receptor type 2 antagonist (SSTR2a), which works by preventing the binding of somatostatin with SSTR2 by competitive inhibition. Preventing somatostatin from binding SSTR2 can stimulate the glucose counterregulatory response to hypoglycemia by effectively restoring glucagon secretion from alpha cells, and ultimately, raising blood glucose. PRL-2903 is an 8-amino acid cyclic peptide, with a molecular weight of 1160 Daltons. This peptide can be produced chemically using solid-phase peptide synthesis. In the preferred embodiment, the concentration range of PRL-2903 is 0.5-20 mg/mL, more preferably 1-10 mg/mL, and more preferably 5 mg/mL.

Composite Microneedle Patch

Microneedle patches are a useful dosage form for delivering large molecule therapeutics, and especially biomacromolecules, such as peptides and proteins. Delivery of protein and peptide therapeutics are typically carried out with parenteral administration (e.g. by injection) since the oral pathway contains many harsh conditions, such as high acidity of the stomach and the presence of peptide-degrading enzymes, which are detrimental to the stability and bioactivity of the therapeutic. Moreover, traditional transdermal patches or topical administration is generally not a suitable route given that most biomacromolecules are too large for permeation across the skin barrier. The microneedle patch is a clever dosage form that combines the convenience and minimal-invasiveness of a conventional transdermal patch with the delivery capability of a traditional hypodermic needle. Such a system can deliver biomacromolecules across the skin without the pain and inconvenience of a hypodermic needle by using micron-sized needle-like projections that can penetrate the outermost layer of the skin.

Microneedle patches that have been fabricated using metallic, silicon-based, or polymeric-based materials are known in the art; for example, titanium-based microneedles coated with therapeutic agents are currently being developed (Amen, et al., Pharm Res 27, 303-313 (2010)). Composite microneedle patches are usually polymeric-based, which contain drug, microparticle, cells, or any other functional constituents, embedded or integrated within the matrix of the polymeric microneedle patch. The polymeric microneedle patch may be prepared from non-swellable, swellable, dissolvable, or biodegradable polymeric materials. The polymer base may be fabricated from hyaluronic acid, modified hyaluronic acid, crosslinked hyaluronic acid, poly(methyl vinyl ether-co-maleic anhydride), poly(methyl vinyl ether-co-maleic anhydride) PMVE-MAH crosslinked with polyethylene glycol (PEG), polystyrene, poly(styrene-co-methacrylic acid), polycaprolactone, alginate, alginic acid, chitosan, modified chitosan, carboxymethyl cellulose, carboxymethyl cellulose-layered double hydroxides, polyvinyl alcohol, polyvinylpyrrolidone, polyvinylpyrrolidone-co-methacrylic acid, starch, starch-polyethylene glycol copolymers, and many others.

In one embodiment, the composite microneedle patch is composed of glucagon-loaded glucose-responsive microgels embedded within a matrix of a swellable hydrogel material. In the preferred embodiment, the hydrogel material is photo-crosslinked methyacrylated hyaluronic acid (MeHA), or poly(methyl vinyl ether-co-maleic anhydride) crosslinked with polyethylene glycol (PMVE-MAH-PEG). Glucagon-loaded glucose-responsive microgels are embedded into the composite microneedle matrix at a weight ratio of 1 to 10% preferably 2 to 7.5 wt %, more preferably 4 to 5 wt % (with respect to the total monomer content). The concentration range of glucagon loaded within the composite microneedle is in the range of 0.1-2 mg, preferably 0.5-1.5 mg, more preferably 0.75-1.25 mg, and more preferably 1 mg. The molecular weight of MeHA is in the range of 100-1,000 kDa, preferably 200-500 kDa, more preferably 250-350 kDa. The number average molecular weight of PMVE-MAH is preferably 100-1,000 kDa, preferably 200-500 kDa, and more preferably 310 kDa.

Example 1

Various embodiments of the present disclosure can be better understood by reference to the following examples which are offered by way of illustration. The present disclosure is not limited to the examples given herein.

Materials and Instrumentation:

Sodium hyaluronic acid (HA, Mw 300 kDa) was a gift from Bloomage Freda Biopharm Co., Ltd. (China). N-(methacryloxypropyl)-N,N-dimethyl-N-(3-sulfopropyl) ammonium betaine (SBMA), methacrylic anhydride (MA), glucose, tert-butyl lithium, 4-amino-3-fluorophenylboronic acid, trimethylborate, acryloyl chloride, N,N,N',N'-tetramethylethylenediamine (TMEDA), N-(3 dimethylaminoethyl) methacrylate, rhodamine B, ammonium persulfate (APS), sodium bicarbonate ($NaHCO_3$), methyl bromoacetate, N,N'-methylenebisacrylamide (MBA), myristyl sulfobetaine (MSB), poly(vinylpyrrolidone) (PVP), azobis(isobutyronitrile) (AIBN), and photoinitiator (Irgacure 2959) were purchased from Sigma-Aldrich (USA). USP-grade human recombinant insulin (27 U/mg) was purchased from Wisent (QC, Canada). Glucagon was synthesized and purchased from Biomatik Corp. (ON, Canada). HPLC-grade acetonitrile and water were purchased from Caledon Labs (ON, Canada). All reagents were of analytical grade or higher and used without further purification.

The effect of glucose concentration on microgel size was characterized using dynamic light scattering (DLS, Malvern Zetasizer Nano-ZS). Adjustment of pH was made using NaOH or HCl. Dimensions and surface morphology of freeze-dried microgels were examined by scanning electron microscopy (SEM/EDX) at an acceleration voltage of 20 kV. Transmission electron microscopy (TEM) images were performed on a Hitachi H-7500 transmission electron microscope operated at 80 kV. In addition, Rhodamine-B (Rh-B) labelling was applied to track the distribution of microgels within the microneedle array. The microgels were first immersed in 10 μg/mL of Rh-B for 12 hours at room temperature and then washed with DI-water three times. Rh-B labelled microgels were observed with an inverted fluorescence microscope (IX 71, Olympus) equipped with a CCD camera. Glucagon and its degradation products were assayed using a reversed-phase high-performance liquid chromatography (RP-HPLC) system (Waters, MA, USA) equipped with a binary pump, autosampler, and UV detector (2899 Photodiode Detector Array, Waters, MA, USA). $^1$H-NMR, and $^{11}$B-NMR spectra were recorded in dimethyl sulfoxide (DMSO) and deuterium oxide ($D_2O$) with a Bruker AM 400 spectrometer (400 MHz). The bonding configurations of the samples were characterized by means of their FTIR spectra using a Paragon 1000 spectrometer (Perkin Elmer). The hydrolyzed samples were obtained by incubation of the mixture at alkaline condition (pH~9) for one hour. Circular dichroism (CD) spectropolarimetry in the far-ultraviolet wavelength region (from 200 to 260 nm) was employed to evaluate the secondary structure of glucagon. Glucagon released from microgels or MNs were collected and measured using a CD spectropolarimeter (Jasco J-810, MD, USA) equipped with a Peltier temperature module set to 25° C. Samples were diluted with media containing glucagon solubilizer (MSB) in pH 7.4 PBS and transferred to a 1 cm path length quartz cuvette for far-UV measurements. Samples were scanned at 1 nm intervals between 200 and 260 nm using an 8 s response time. Measurement was repeated five times and averaged. Sample spectra were compared with the spectrum of standard fresh glucagon solution (glucagon with MSB solubilizer in pH 7.4 PBS).

The mechanical strength of composite MN patches was measured using an Instron 3366 universal testing machine with a compression load cell. Instantaneous load (force; N) and displacement (distance; mm) were recorded by the testing machine every 0.05 s to generate the load-displacement curve. The force-at-break was recorded as the needle began to buckle.

Preparation of Monomers
Materials and Methods
Glucose-Responsive Monomer, 4-Acrylamido-3-Fluorophenyl Boronic Acid (AFBA)

4-Amino-3-fluorophenylboronic acid (1.0 mmol) and $NaHCO_3$ (2.0 mmol) were dissolved in a mixture of water and THF (2/1 v/v). To this solution, acryloyl chloride (2.0 mmol) was added at 0° C., and the mixture was stirred for 1 h. At this time, a slurry-like mixture had formed and the resulting solid in the mixture was vacuum filtered and the obtained aqueous solution was extracted with 30 ml of ethyl acetate. The extracted layer in the ethyl acetate was dried over $MgSO_4$ and the volume was reduced to 10 mL with a rotary evaporator. The obtained solution was added dropwise to 100 mL of hexane with vigorous stirring to precipitate a yellowish solid. To purify, the obtained light-yellow solid was dissolved in 10 mL of ethyl acetate and precipitated in 100 mL of hexane and then the formed suspension was refrigerated to maximize the size of crystal formation. The final solid powder was dried in a vacuum overnight with a yield of 47%.

Cationic Carboxybetaine Ester (CB), Monomer for Assisting Glucagon-Loading

Cationic carboxybetaine ester (CB) monomer was synthesized following a previously published method. (Zhang et al., 2008) Briefly, N-(3 dimethylaminoethyl) methacrylate (25 mmol), methyl bromoacetate (37.5 mmol), and acetonitrile (30 mL) were added into a 100 mL round-bottom flask and reacted under $N_2$ for 6 hours at 0° C. The product was precipitated and washed with anhydrous acetone. The acetone was removed to obtain a white powder (97% yield).

Results

Figure 3:
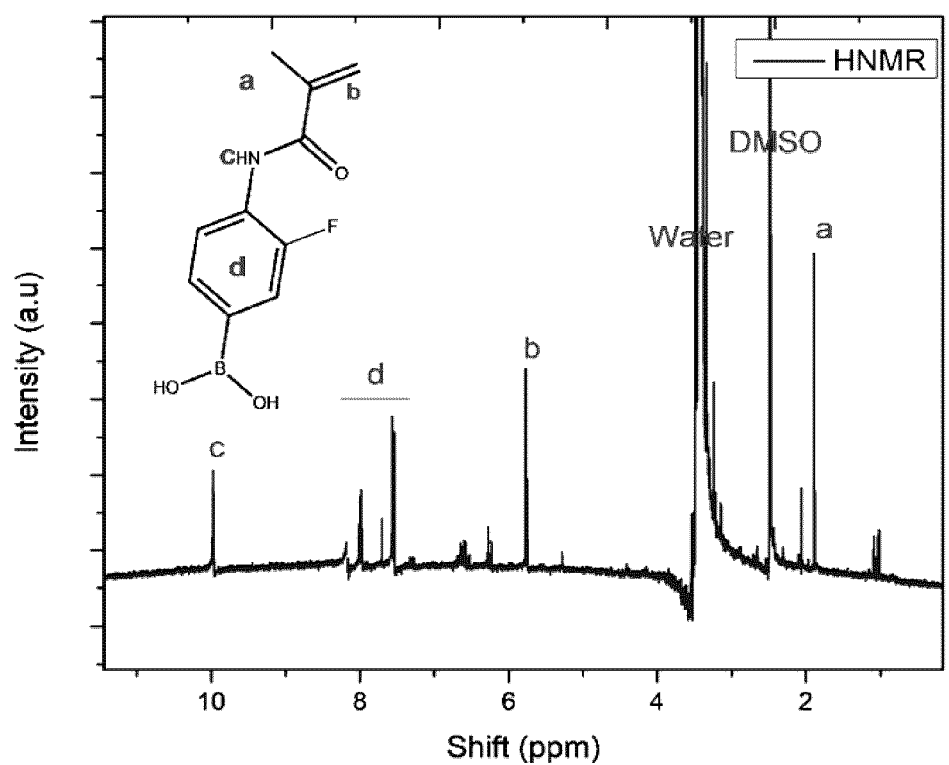
FIG. 3 is a $^1$H-NMR spectrum of the monomer, 4-acrylamido-3-fluorophenylboronic acid (AFBA). Deuterated dimethyl sulfoxide (DMSO-$d_6$) was used as a good solvent for the pure monomer and its solvent peak was observable as a strong signal at 2.5 ppm.

The structure of the AFBA monomer was confirmed by H-NMR (see FIG. 3). The structure of the CB monomer was confirmed by H-NMR. H-NMR (300 MHz, $D_2O$, d): 2.02 (m, 2H, —$CH_2$—), 3.25 (s, 6H, Nfl($CH_3$)$_2$), 3.37 (t, 2H, $CH_2$—N), 3.58 (m, 2H, $CH_2$—N), 3.79 (s, 3H, O—$CH_3$), 4.29 (s, 2H, $CH_2$—C=O), 5.77 (m, 1H, CH=C—CON-trans), 6.19 (m, 1H, CH=C—CON-cis), 6.23 (m, 1H, =CH—CON—).

Example 2

Preparation and Characterization of Glucose-Responsive Hormone-Loaded
Microgels
Materials and Methods Terpolymeric microgels (abbreviated S.A.C.) composed of SBMA, AFBA and CB comonomers were synthesized using dispersion polymerization. Various monomer feed ratios (Table 1), AIBN as initiator (1 mol %), PVP as stabilizer (1 mol %) and 30 g of water-in-ethanol (30/70 w/w) as reaction medium were all mixed, filtered and then added to a 100 mL flask. In the next step, the mixture was deoxygenated for 20 min with nitrogen and transferred to a water bath at 65° C. to start the polymerization process. After starting the reaction, the produced oligomers became insoluble in the surrounding medium, to form nuclei for particle growth. After the nucleation step and when the solution became turbid, a separate solution of crosslinker (MBA) of variable concentrations (Table 1) in 10 mL of water-in-ethanol (30/70 w/w) was added dropwise by a syringe pump at a rate of 5 mL/h. This delay in adding crosslinker is because of its higher reactivity that can prevent the nucleation step. The mixture was stirred at 150 rpm overnight. The obtained polymeric particles were cooled, washed two times with ethanol and dialyzed for 2 days in 1 L of distilled water to remove free stabilizer chains and unreacted monomers. The final polymeric microgels were lyophilized to obtain solid white particles. Table 1 presents the experimental conditions for the synthesis of the microgels.

Glucagon loading: In a typical process, fixed amount of glucagon (2 mg) was added to 1 mg of microgel dispersion in DI water. The pH of the mixture was raised from 6 to 9 to increase the number of anionic charges on glucagon, and the mixture was kept in a shaking incubator for 1 hour at room temperature. The mixture was then centrifuged (1000 rpm) and dehydrated by freeze-drying for further analyses. The amount of free glucagon in the collected supernatant was quantified using a gradient RP-HPLC method as described in the RP-HPLC section. The glucagon loading efficiency (LE, % w/w) and content (LC, % w/w) were calculated using the following equations:

$$LE\ (\%) = \left(\frac{M_{Feed} - M_{Free}}{M_{Feed}}\right) * 100 \quad LC\ (\%) = \left(\frac{M_{Loaded}}{M_{Total}}\right) * 100$$

where $M_{Feed}$ was the amount of total glucagon used during loading, $M_{Free}$ was the amount of glucagon remaining in the supernatant (unloaded), $M_{Loaded}$ was the amount of glucagon loaded into microgels, and $M_{Total}$ was the total mass of the microgel complex.

TABLE 1

Composition of microgels. Crosslinker mol % is represented with respect to the total monomer concentrations.

| Sample name | SBMA (mol %) | AFBA (mol %) | CB (mol %) | MBA (mol %) | Yield (%) | PDI |
|---|---|---|---|---|---|---|
| SAC1 | 80 | 10 | 10 | 1.5 | 80.1 | 0.02 |
| SAC2 | 75 | 15 | 10 | 1.5 | 78.2 | 0.03 |
| SAC3 | 70 | 20 | 10 | 1.5 | 74.3 | 0.07 |
| SAC4 | 75 | 15 | 10 | 1 | 64.8 | 0.29 |
| SAC5 | 75 | 15 | 10 | 4.0 | 59.1 | 0.23 |
| SAC6 | 80 | 15 | 5 | 1.5 | 79.6 | 0.03 |
| SA | 85 | 15 | 0 | 1.5 | 72.2 | 0.02 |

Results

Figure 4:
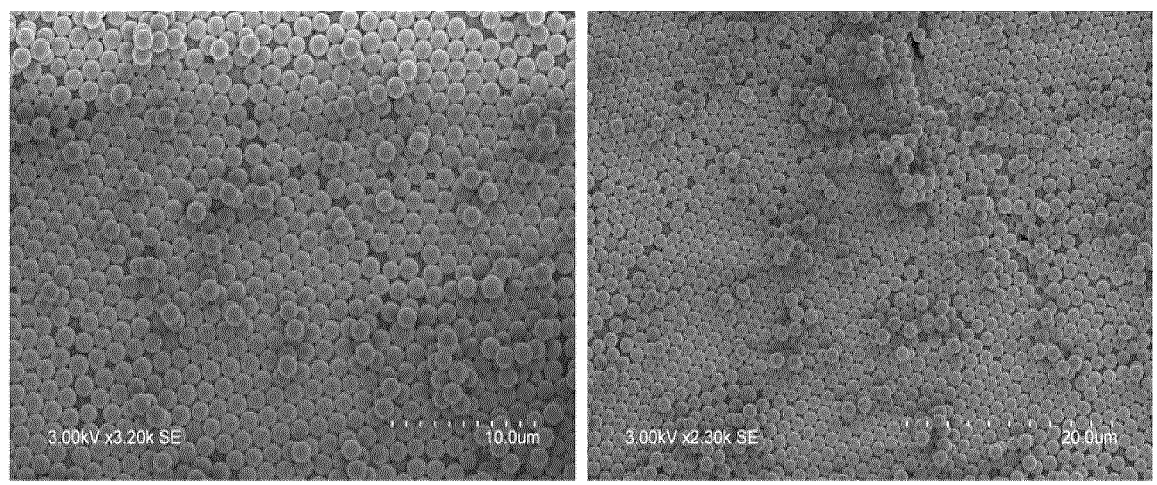
FIG. 4 illustrates scanning electron microscopy (SEM) images of freeze-dried microgels prepared with different AFBA concentrations: 10 mol % (left) and 15 mol % (right).
Figure 5:
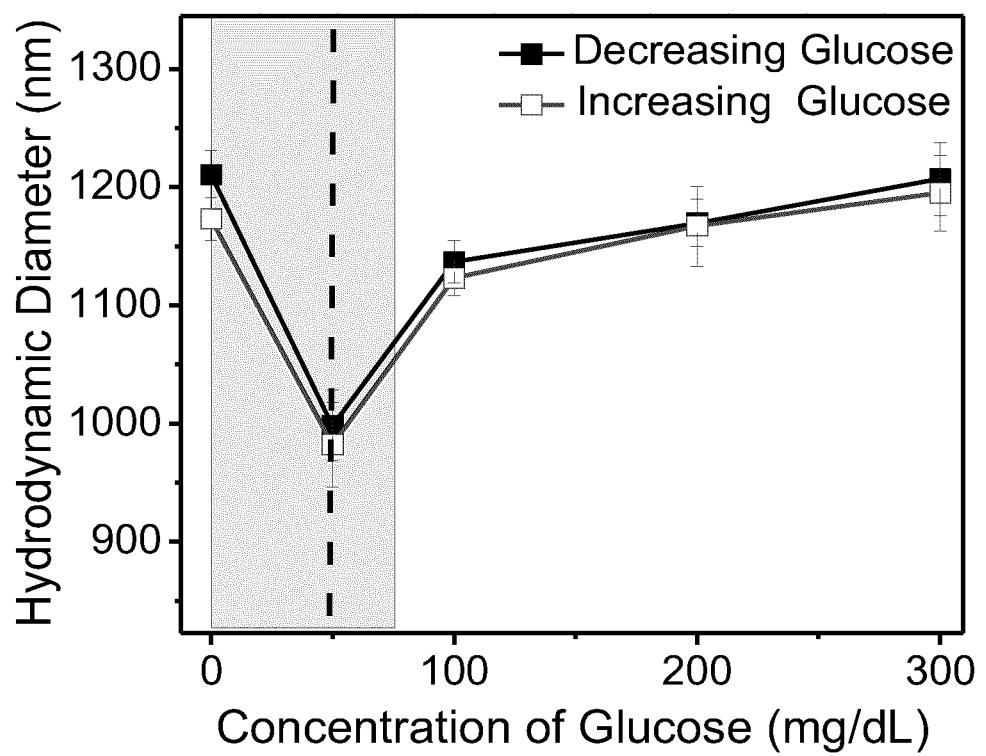
FIG. 5 is a graph illustrating the DLS result of a select microgel composition at different glucose concentrations (critical point and hypoglycemic area shown by dashed lines and yellow boxes, respectively).

The resulting microgels were spherical in shape and uniformly sized with an average diameter of around 1 µm as determined by scanning electron microscopy (SEM) (FIG. 4). Dynamic light scattering (DLS) characterization of microgel size verified that the purified microgels exhibited glucose-dependent size changes in pH 7.4 phosphate buffer supplemented with physiologically relevant glucose concentrations ranging between 50 to 300 mg/dL (FIG. 5). These size changes are consistent with the proposed glucose-responsive mechanism.

Figure 6:
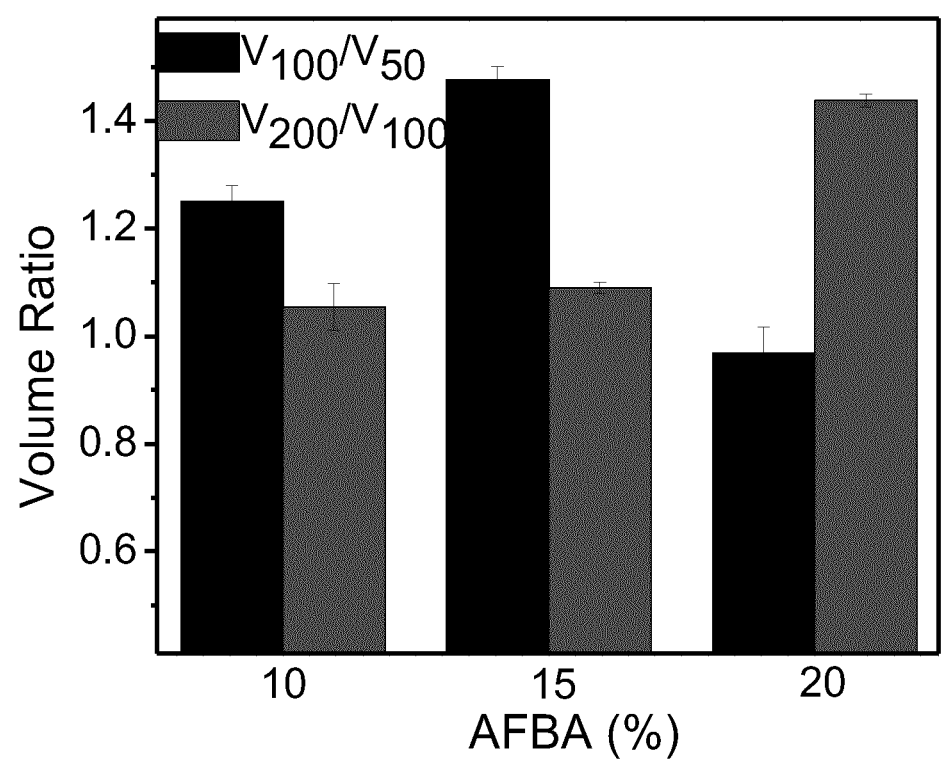
FIG. 6 is a graph illustrating the volume change ratios of microgels going from hyperglycemia-to-euglycemia (200-100 mg/dL) and from euglycemia-to-hypoglycemia (100-50 mg/dL) with respect to AFBA content (mol %).

The glucose-responsive behavior of the system was optimized for volume contraction-triggered glucagon delivery at hypoglycemia by altering the chemical composition of the microgel (FIG. 6). Microgels with higher AFBA content exhibited a higher glucose transition point (critical point), defined as the glucose concentration with maximum volume reduction, while those with higher MBA crosslinker content exhibited increased hysteresis. Among the various microgel compositions investigated, those containing 15% AFBA provided the maximum volume contraction at hypoglycemic levels (50 mg/dL) and was selected to be used in the composite MN patch.

Figure 7:
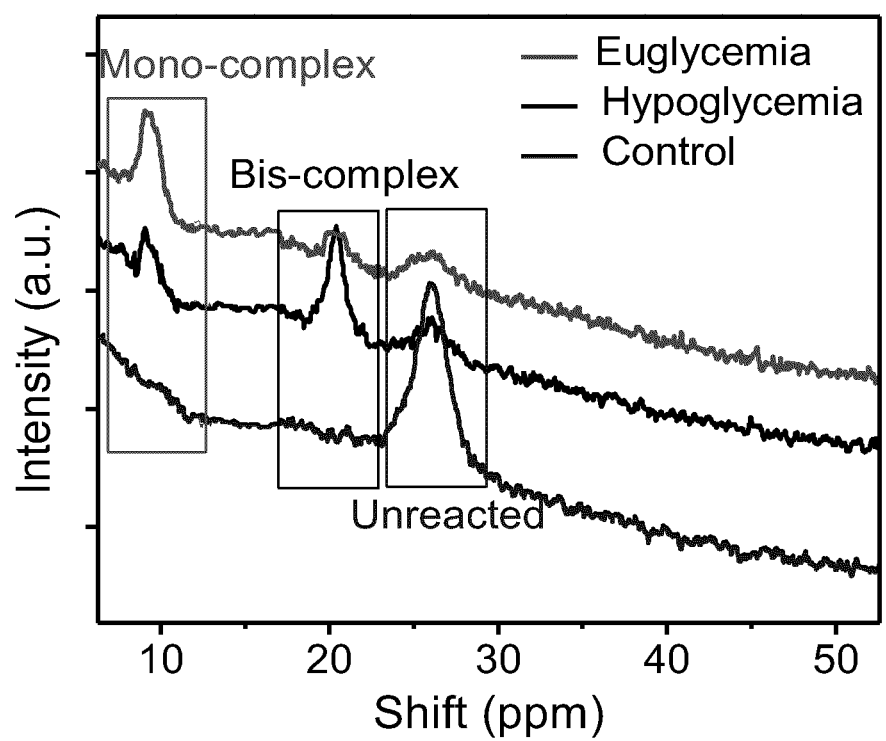
FIG. 7 is a graph illustrating the $^{11}$B-NMR spectra of microgels in the absence and presence of various glucose concentrations corresponding to hypoglycemia (50 mg/dL) and euglycemia (100 mg/dL).

To elucidate the binding mechanism between glucose and AFBA moieties of microgels, the changes in the $^{11}$B-NMR spectra of microgels in the absence and presence of different glucose concentrations corresponding to hypoglycemia (50 mg/dL) and euglycemia (100 mg/dL) were studied (FIG. 7). The $^{11}$B-NMR spectrum of the microgels in the absence of glucose revealed a peak at 28.4 ppm correlating to uncomplexed fluorophenylboronic acid in its sp$^2$-hybridised form. After addition of glucose, the peak from unreacted AFBA at a chemical shift of 28.4 ppm decreased and two new peaks appeared at a chemical shift of 19.9 and 8.7 indicating the formation of mono- and bis-complexation with glucose, respectively. It is evident from the results that increasing the glucose concentration also increased the likelihood of transition from bis-complexation to mono-complexation, confirming the different binding mechanism at low and high glucose concentrations.

Figure 8:
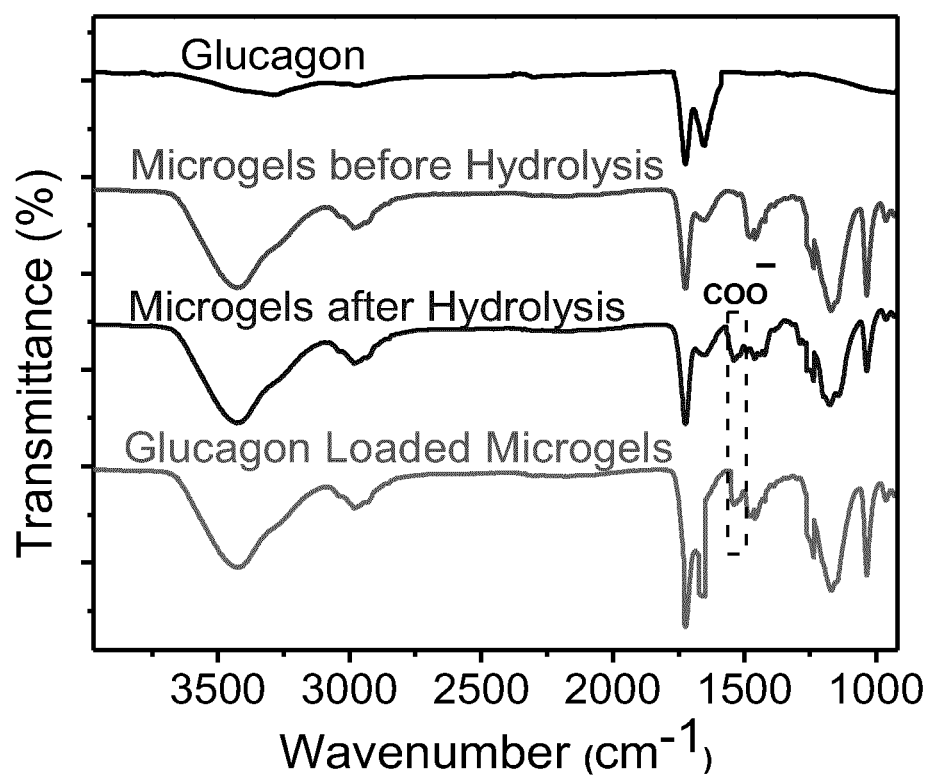
FIG. 8 is a graph illustrating the FTIR spectra of native glucagon, glucagon-loaded microgel, and microgels before and after hydrolysis.

The chemical structure of the microgel was confirmed by FTIR (FIG. 8). The existence of sulfobetaine methacrylate segments in microgels could be confirmed from the presence of the ester carbonyl groups and sulfonate groups observed from the bands corresponding to —SO$_3^-$ stretching at 1033 cm$^{-1}$ and O—C=O stretching at 1727 cm$^{-1}$, respectively (GhavamiNejad et al., 2016a). Furthermore, the FTIR band at 1183 cm$^{-1}$ can be attributed to the S=O group, and the absorption band at 1480 cm$^{-1}$ is mainly due to the C—H stretching of —N$^+$(CH$_3$)$^2$. FTIR spectrum of substituted fluorine derivatives of fluorophenylboronic acid can also be assigned to the wavenumber 1254 cm$^{-1}$ due to the C—F stretching mode (Karabacak et al., 2015).

Glucagon loading within the microgel was initiated by electrostatic interaction between glucagon, which holds a net negative charge in the pH~9 loading media, and cationic CB moieties of the microgel (Knop et al., 2003, Rastogi et al., 1990). Prolonged incubation of microgels at alkaline conditions led to the hydrolysis of the methyl ester of the cationic CB, leaving behind the zwitterionic CB moiety (Ji et al., 2013, Sinclair et al., 2013, Jin et al., 2014, Li et al., 2015), and breaking the electrostatic interaction between glucagon and CB, which results in the physical entrapment of glucagon within the hydrogel network. The glucagon loading content and efficiency were calculated to be 18.1±3.5% and 11.6±2.7% respectively.

Example 3

Preparation and Characterization of the Composite MN Patch

Materials and Methods

Synthesis of Methacrylated Hyaluronic Acid (Me-HA)

Me-HA was synthesized according to the literature with a slight modification (Hachet et al., 2012). Briefly, 2.0 g of HA was dissolved in 100 mL DI water. 1.6 mL of methacrylic anhydride (MA) was then added dropwise to the solution. The pH of the solution was adjusted to pH 8-9 with 5 N NaOH. The reaction was kept at 4° C. under continuous stirring for 24 hours. In the next step, NaCl was added to the reaction solution to reach a NaCl concentration of 0.5 M before Me-HA was precipitated out in ethanol. The precipitate was washed with ethanol three 3 times, re-dissolved in DI water and dialyzed against DI water for 2 days. The purified product was obtained by lyophilization (yield: 84%) and characterized by $^1$H-NMR spectroscopy. The degree of modification was determined to be 15% by integration of methacrylate proton signals at 6.1 and 5.7, to the peak at 1.9 ppm related to the N-acetyl glucosamine of HA.

Fabrication of the Composite Microneedle Patch

To fabricate composite MNs embedded with glucagon-loaded SAC microgels, the glucagon-loaded glucose-responsive microgel suspension was first deposited by pipet into the cavity of the PDMS mold. Afterwards, molds were centrifuged at 4000 rpm for 3 min to force material into microneedle voids of the mold. In the next step, polymer solution of Me-HA (50 mg/mL) containing crosslinker N,N'-methylenebisacrylamide (MBA, 1 mg/mL) and photoinitiator (Irgacure 2959, 0.5 mg/mL) were added into the mold to produce a robust backing. Then, the casts were dried at room temperature in a fume hood overnight. After complete desiccation, the MNs were carefully separated from the mold and crosslinked using brief UV irradiation (wavelength: 365 nm). Composite microneedle arrays with a thin film at the base and sharp needles (ca. 800 μm tall, 300 μm base diameter, and 600 μm pitch) were successfully fabricated from this process.

Mechanical Strength Test

The mechanical strength of composite MN patches was measured using an Instron 3366 universal testing machine with a compression load cell. The MN patch was placed flat on its backside (tips facing upwards) on a flat-head stainless steel cylindrical plate. A vertical force was applied perpendicularly (at a constant speed of 0.5 mm/min) to the MN patch using a 4.5 cm diameter flat-head stainless steel cylindrical probe. The displacement was measured until the MN tips began to buckle (break). The initial distance between the base of microneedle patch and the flat-head of the probe was set at 2 mm, with a cell loading capacity set at 10 N. Instantaneous load (force; N) and displacement (distance; mm) were recorded by the testing machine every 0.05 s to generate the load-displacement curve. The force-at-break was recorded as the needle began to buckle.

Results

Figure 9:
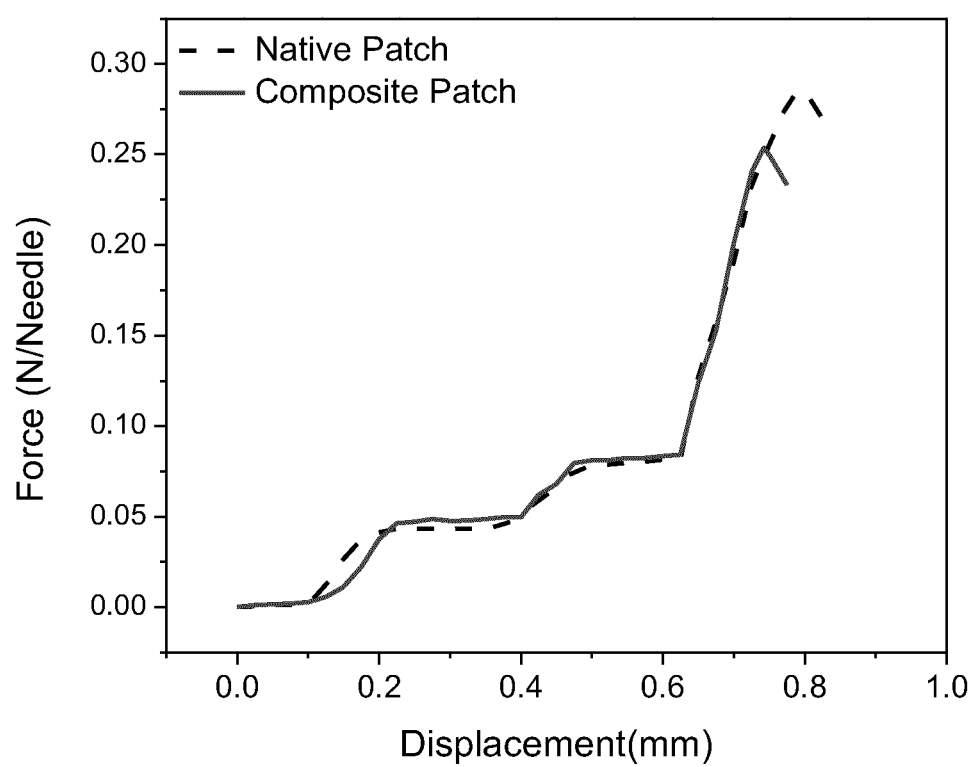
FIG. 9 is a graph illustrating the compression test of sham and composite microneedle patches. Force-at-break was characterized by the peak prior to the drop (0.25 N/Needle for the composite patch, 0.28 N/Needle for the sham patch).
Figure 10:
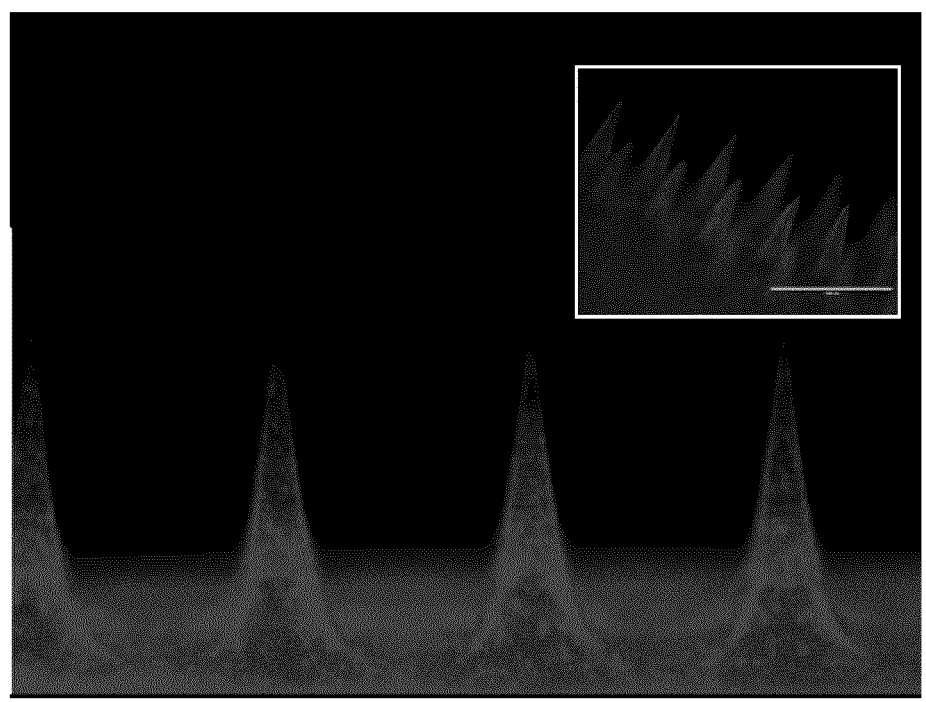
FIG. 10 is a fluorescence microscopy image of composite microneedles embedded with Rhodamine B-labeled microgels (scale bar: 1000 µm).
Figure 11:
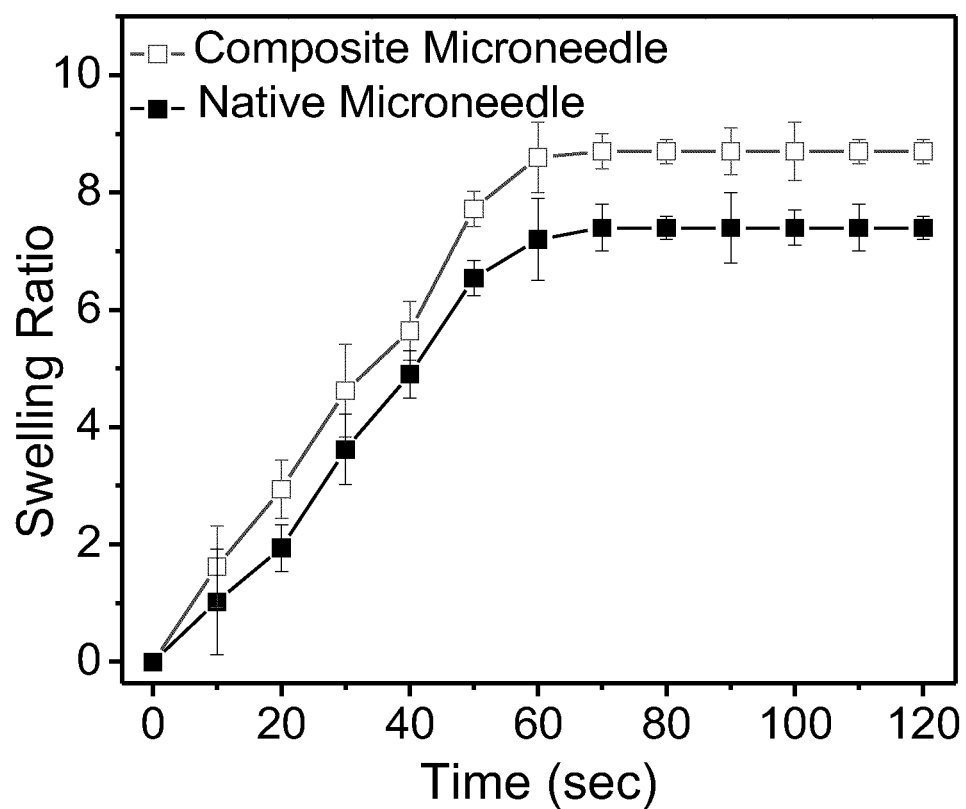
FIG. 11 is a graph illustrating the volume change (swelling) of native and composite patches inserted into a 1.4 wt % agarose hydrogel (inset: fluorescence microscopy image of composite MN patch after reaching the maximum swelling).

The structure of the Me-HA was confirmed by $^1$H-NMR. Me-HA: $^1$H-NMR (D$_2$O, 300 MHz, δ ppm): 1.85-1.96 (m, 3H, CH$_2$=C(CH$_3$) CO), 1.99 (s, 3H, NHCOCH3), 5.74 (s, 1H, CH1H2=C(CH3) CO), 6.17 (s, 1H, CH1H2=C(CH3) CO). The dry composite MNs were ~800 μm tall and featured sharp tips. The mechanical behavior of the dry patches was not adversely affected by incorporation of the microgels (FIG. 9) (Yan et al., 2014). Fluorescence imaging of Rhodamine-B-labeled microgels within the MN structure confirmed even particle distribution throughout the needle tips (FIG. 10). The composite MN swelled rapidly upon insertion into an agarose hydrogel. The maximum swelling ratio of the hyaluronic acid and composite patches were calculated to be 7.1±0.3 and 8.8±0.4 times of their initial volume, respectively. Maximum swelling was attained within 1 min after insertion into the hydrogel (FIG. 11). The increased swelling ratio of the composite patch may be attributed to the higher hydrophilicity of microgels compared to hyaluronic acid. Microgel leaching from the swollen MNs was not observed, presumably due to their large size compared to the MN mesh spacing, which could be an advantage for controlling drug release from patch (GhavamiNejad et al., 2016b).

Example 4

In Vitro Glucagon Release in a Glucose-Responsive Manner

Materials and Methods

RP-HPLC was employed to evaluate the glucagon content delivered by microgels and composite MN patches in media with varying glucose concentrations. The chromatographs of released glucagon from the patch were compared with the standard fresh glucagon solution (glucagon with MSB solubilizer in pH 7.4 PBS). Native glucagon was separated from any potential degradation products on a C-18 column (Kinetex 2.6 μm, C-18, 100 Å, 150×4.6 mm, Phenomenex, CA, USA). For all separations, 40 μL was injected into the column with a flow rate of 0.75 mL/min. The mobile phase consisted of solvent A (0.1% v/v TFA in water) and solvent B (0.1% v/v TFA in acetonitrile). A linear gradient from 72% A to 47% A over 25 min in conjunction with a linear gradient from 28% B to 53% B over 25 min, was used for all separations. The column was washed using 72% A and 28% B for 15 min between samples. Elution times of glucagon and any degradation products were monitored at 220 nm wavelength using the UV detector. The column was maintained at 34° C. (skin temperature) throughout the experiment.

Glucagon Release from Microgels

Glucagon release from microgels was determined by immersing glucagon-loaded microgels first in 5 mL of PBS (pH=7.4) with MSB surfactant (9 mmol/mL) and different glucose concentration at 37° C. It should be noted that MSB were added as a detergent in the PBS to solubilize glucagon at physiological pH. The microgels were separated from the dispersion by centrifugation (1000 rpm, 2 min) and released glucagon in the media was measured by a gradient HPLC method.

Glucagon Release from Composite MN Patch

Figure 12:
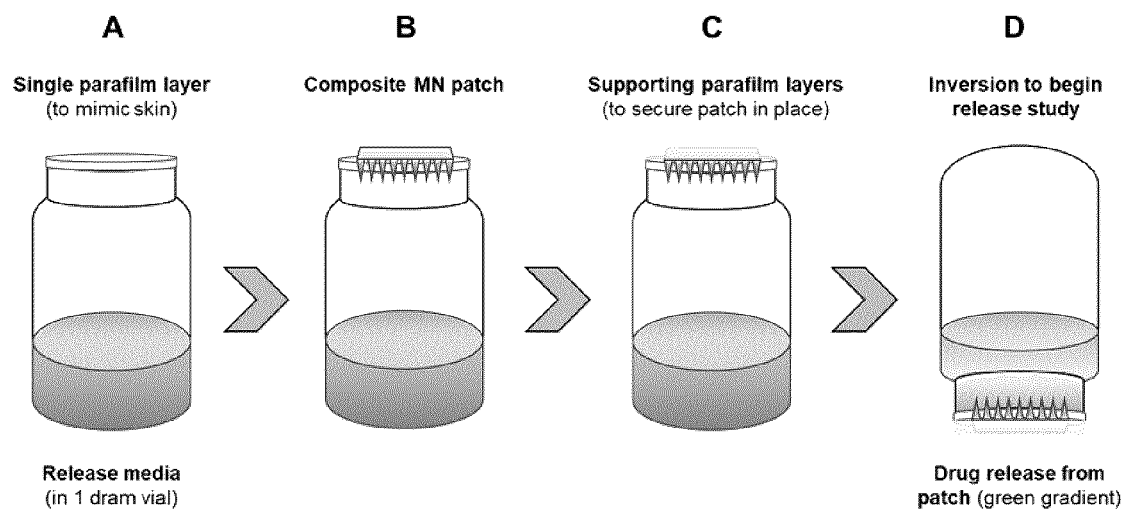
FIG. 12 is schematic representation of the glucagon release study with MN patches: (A) vials containing media sealed with a single parafilm membrane, (B) composite MN patch embedded with glucagon-loaded microgels applied to the parafilm, (C) additional parafilm layers applied behind and around the patch to secure it in place and prevent leakages, (D) vials were inverted and placed in a 34° C. incubator for 60 minutes.

Clear 1 dram vials containing 1 mL of pH 7.4 PBS and MSB surfactant (9 mmol/mL) sealed with a parafilm membrane were employed as the release apparatus (FIG. 12). MN patches embedded with glucagon-loaded microgels were applied to the parafilm membranes and further sealed with additional parafilm. Vials were inverted and placed in a 34° C. incubator. Glucagon released over time was collected and measured using RP-HPLC as previously described. Various glucose levels (0, 50, and 100 mg/dL) were added to the release medium during the release study to evaluate the glucose-responsive release profile of the MN patch system.

Results

Figure 13:
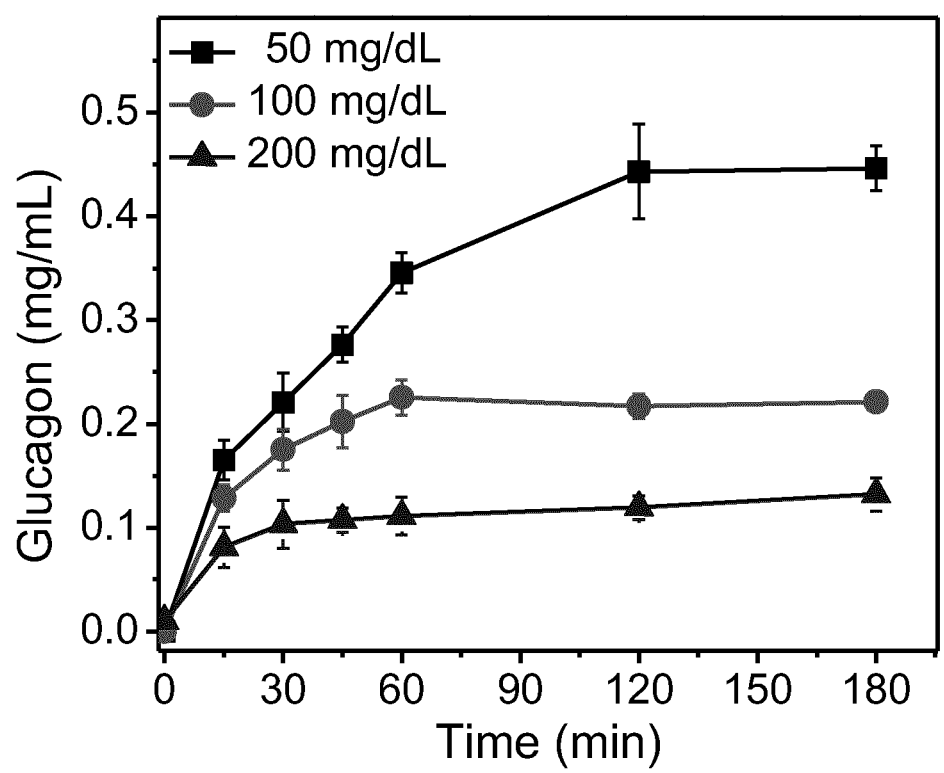
FIG. 13 is a graph illustrating the in vitro glucose-responsive release profiles of glucagon from microgels in a simulated hyperglycemic (200 mg/dL), a euglycemic (100 mg/dL), and a hypoglycemic level (50 mg/dL).
Figure 14:
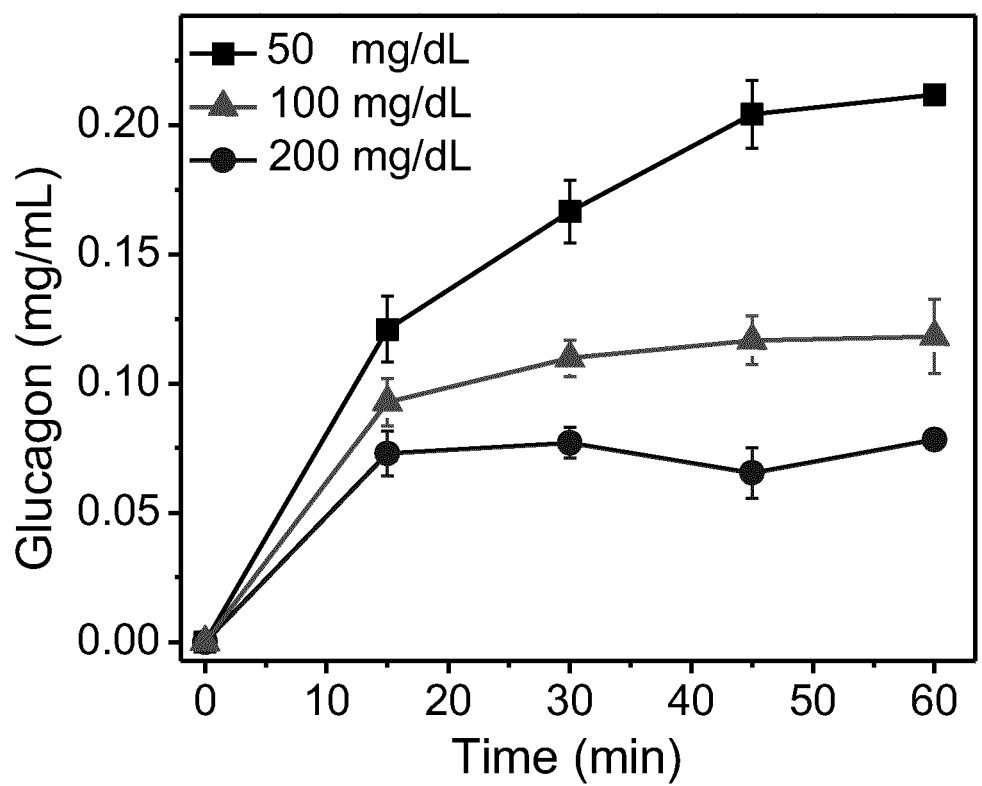
FIG. 14 is a graph illustrating the in vitro glucose-responsive release profiles of glucagon from composite MN patch in the various glucose concentrations (same set as described in FIG. 13).
Figure 15:
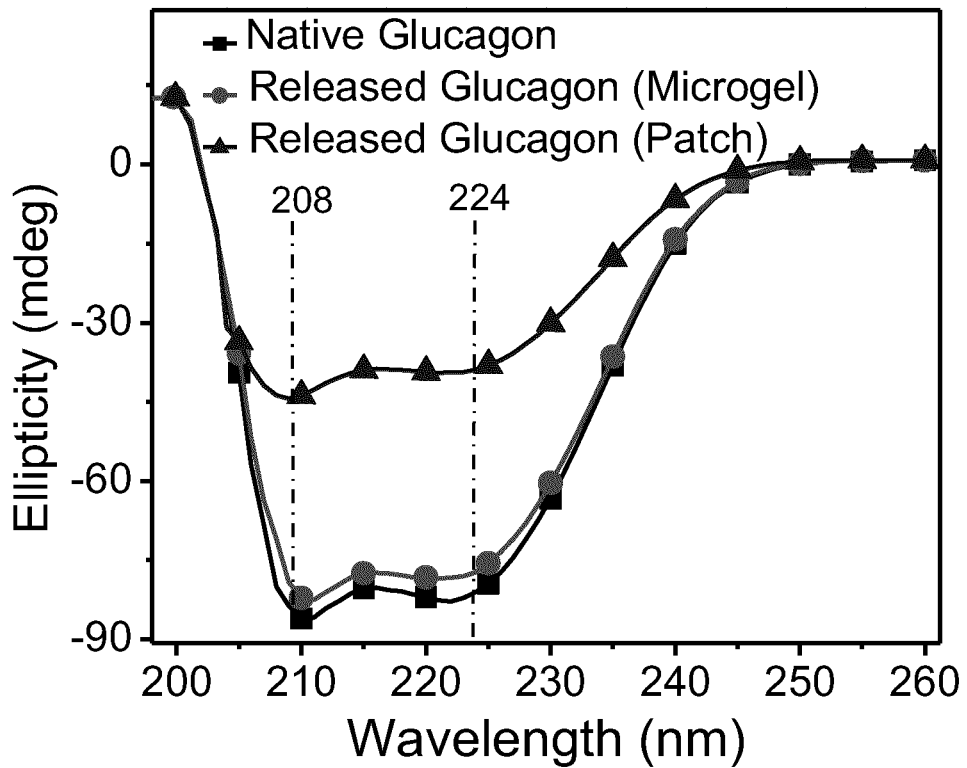
FIG. 15 is a graph illustrating the CD spectra of native glucagon solution and glucagon released from the microgels and composite patch incubated at the 50 mg/dL glucose concentration (hypoglycemia).
Figure 16:
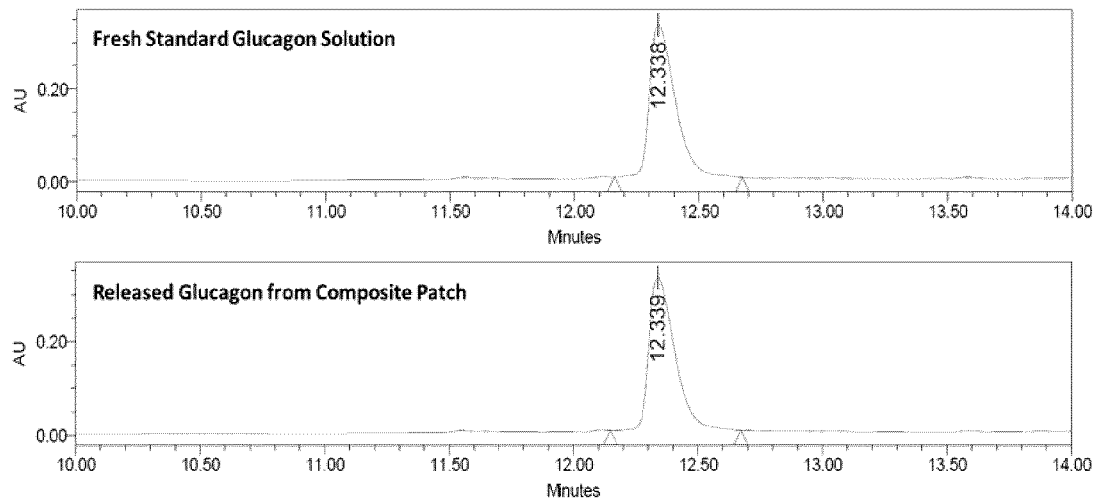
FIG. 16 is a graph illustrating representing RP-HPLC results of released glucagon from composite patch and standard native glucagon in media. Time of glucagon elution was approximately 12.4 minutes using a gradient method. No degradation peaks were observed.

Glucose-dependent release of glucagon from the microgels was quantified in vitro in pH 7.4 phosphate buffer supplemented with various physiologically relevant glucose concentrations. As shown in FIG. 13, the volume changes of microgels was found to be one of the key factors in controlling the release of physically entrapped glucagon from the microgels. At low glucose concentration, a sharp shrinking process occurs that rapidly release glucagon via the squeezing mechanism (Shin et al., 2001). Approximately 45% of the loaded glucagon was released after 180 min of exposure to hypoglycemic levels. Compared with the release rate of glucagon at hypoglycemic state, the preloaded glucagon showed slower release at euglycemic and hyperglycemia condition with about 21% and 15% of the loaded glucagon released to the media, respectively. To validate the glucose-responsiveness of the composite MN patch, glucagon release study was further performed on the composite MN patch (FIG. 14). To mimic clinical practice, the needle tips of the composite patches were pressed through a layer of parafilm to access the release media reservoir. The same glucose-responsive drug release trend was observed, albeit with slightly slower release rates, possibly due to the delayed diffusion of glucagon through the Me-HA network (Chang et al., 2017). Far-UV CD spectropolarimetry was used to evaluate the secondary structure of the released glucagon and the result was compared to standard fresh (native) glucagon (FIG. 15). The spectra of both released glucagon and fresh glucagon revealed two negative peaks at 208 and 222 nm characteristic of glucagon's alpha-helical structure (inside the hydrophobic environment of MSB micelles), suggesting that the secondary structure of glucagon was preserved during loading and release. The above results are in agreement with the RP-HPLC results where the elution time of released glucagon and fresh glucagon were similar at ~12 min with no detectable degradants (FIG. 16). The preserved stability of glucagon within the introduced system could be due to the super-hydrophilicity of zwitterionic SB and CB groups, which have a tendency to recruit a large amount of non-altered hydrogen-bonds from water molecules to hydrate the core of the peptide upon unfolding (Webber et al., 2016, Kitano et al., 2005). While further investigation is still required to elucidate the specific mechanism(s) of increased glucagon stability, the ability to maintain native glucagon stability during loading and subsequent release from the zwitterionic microgels provides new opportunities in the development of unstable polypeptide delivery systems.

Example 5

Figure 17:
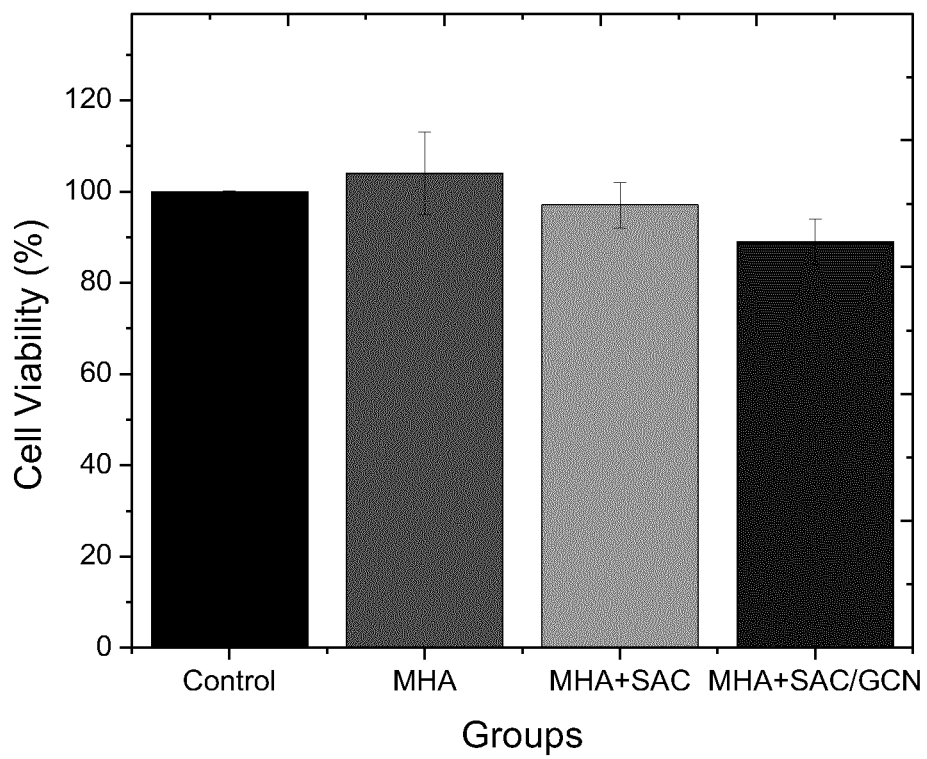
FIG. 17 is a graph illustrating cytotoxicity associated with composite patch components. MHA: native sham MN patch, MHA+SAC: MN patch with microgels but without glucagon, and MHA+SAC/GCN: composite MN patch embedded with glucagon-loaded microgels.

Biocompatibility Evaluation
Materials and Methods
The in vitro cytotoxicity of composite MN patch materials was measured by performing 3-(4,5)-dimethylthiahiazo(-z-yl)-3,5-di phenytetrazoliumromide (MTT) assay on NIH3T3 fibroblast cells (from ATCC). Briefly, cells were seeded in 96-well plate at a density of 10000 cells per well. After 24 hours incubation in 200 μL of Dulbecco's Modified Eagle Medium (DMEM) with 10% fetal bovine growth serum (FBS), samples were added into wells. The cells were incubated for 24 hours after treatment, and then 100 μL of MTT reagent were added to each of the treated wells and were incubated for 4 hours. In the next step, 100 μL of a solution of 10% SDS in 0.01 M HCl were added and incubated for an additional 4 hours. Finally, the absorbance of the plates was read at 550 nm using a BioRad UV-Vis plate reader.
Results
Results showed (FIG. 17) that NIH-3T3 fibroblast viability was not significantly influenced, suggesting that the MN materials were biocompatible. Only the sample containing glucagon showed a slight cytotoxicity due to the mild cytotoxic effect of released glucagon (which were incubated for 24 hours at 37° C.) on NIH-3T3 fibroblasts in the culture medium (Ward W K, 2010).

Example 6

In Vivo Studies for Hypoglycemia Prevention on STZ-Induced Diabetic Rats
Materials and Methods
All conducted in vivo studies strictly followed the ethical and legal requirements of the Ontario Animals for Research Act and the Federal Canadian Council on Animal Care guidelines and were approved by the University Animal Care Committee of the University of Toronto.
To assess the skin penetration capability, methylene blue dye-loaded MN patches were applied into the abdomen and back skin of an anaesthetized male Sprague Dawley rat for 5 min and removed thereafter. The morphology changes of MN patch in this process as well as the micro-sized holes on skin were photographed by a digital camera and examined. The skin was then dissected, fixed in neutral buffered formalin (10%), embedded in paraffin wax and sectioned for histological analysis.

Figure 18:
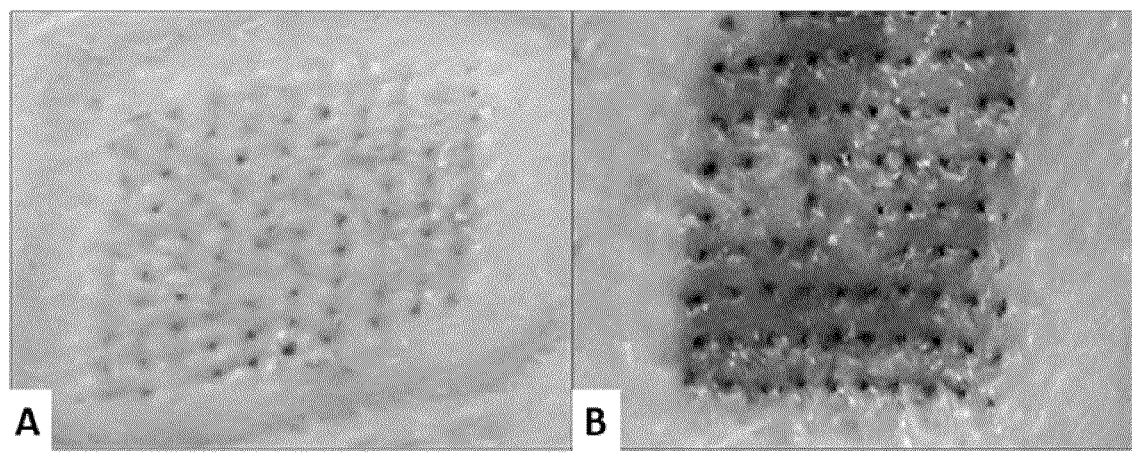
FIG. 18 is a micrograph image illustrating in vivo skin penetration test using methylene blue dye-loaded composite MN patches. Photographs were taken upon removal of patches after (A) 1 min and (B) 20 min.
Figure 19:
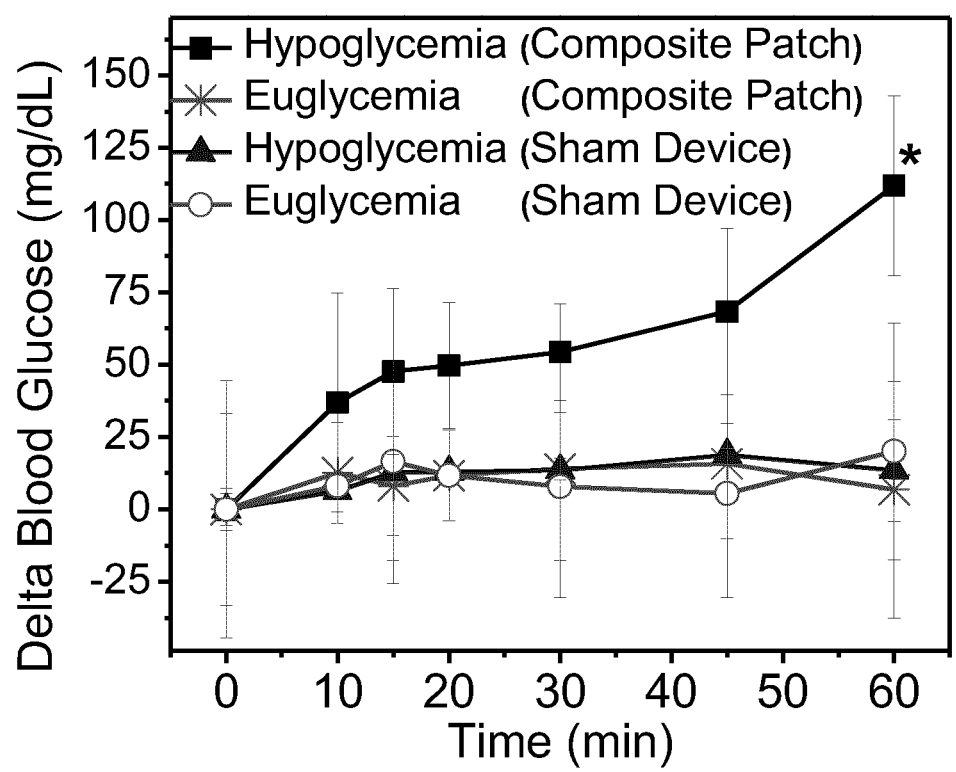
FIG. 19 is a graph illustrating the changes in the blood glucose of type 1 diabetic (T1 D) rats treated with composite MN patch and sham device at varying glucose concentrations induced by injection of a low dose (1 IU/kg) and a high dose of insulin (2 IU/kg). An asterisk (*) indicates a statistically significant difference (p<0.05) between treatment and control group at the specified time point.

Male Sprague Dawley rats (Charles River) were treated with 65 mg/kg streptozotocin (STZ) to induce type 1 diabetes. The rats receiving STZ were carefully monitored for 1 week during which time the blood sugar was measured in 2-day intervals using a glucose meter (OneTouch® Ultra®, LifeScan, Inc., USA). Diabetic rats with blood sugar stabilized above 17 mmol/L were selected for the study. Before starting experiments, the rats were starved for 18 hours and treated with 1.0-2.0 IU/kg of insulin (subcutaneous injection) to induce euglycemia or hypoglycemia, respectively. Prior to applying the patch, the rats were anaesthetized by IP injection of ketamine (100 mg/kg). Diabetic rats were treated with sham device (for control) or composite microneedle arrays containing glucagon-loaded glucose-responsive microgels at 75 minutes following insulin injection. Rat skin was shaven, treated with hair removal cream, and dried prior to MN patch application. Blood glucose was monitored using tail-pricking/strip-method every 5-15 minutes. Hypoglycemia prevention (efficacy) studies were carried out on T1D rats subjected to a high dose of insulin (2.0 IU/kg) treated with composite glucagon MN patches or with sham patches (control). Glucagon composite MN patch was applied 30 minutes prior to administration of high dose insulin. Blood glucose was monitored using tail-pricking/strip-method every 15 minutes for 3 hours. In order to measure the plasma glucagon concentration in vivo, 250 μL of blood sample was drawn from the tail vein of rats at hourly time points. The serum was isolated and stored at −20° C. until assay. The plasma glucagon concentration was measured using a glucagon radioimmunoassay kit (GL-32K, EMD Millipore) with an accuracy of 97±0.8% and a sensitivity of 10 pmol/L.
Results
In vivo performance of the glucose-responsive composite MN patch was evaluated using the STZ-induced type 1 diabetic (T1D) male Sprague Dawley rat model. Successful skin penetration by the MN patch was confirmed using methylene blue staining of rat dorsum skin (FIG. 18).
To investigate the in vivo glucose-responsiveness of the composite patch, T1D rats were given either a 1 or 2 IU/kg dose of human recombinant insulin to decrease blood glucose levels (BGLs) to euglycemia or hypoglycemia, respectively. Then, MNs with and without loaded glucagon were transdermally applied on the shaven backside of rats and BGLs were tracked over a span of 1 hour using a OneTouch UltraMini glucose meter. Upon application of the MN patches to hypoglycemic rats 70 mg/dL), blood glucose levels were significantly raised by 112±31 mg/dL within a 1-hour time-frame (FIG. 19), while blood glucose levels in patched-treated euglycemic rats were only raised by 25±42 mg/dL in the same time-frame (p<0.01). Rats not treated with patches (saline control) also demonstrated minimal increase in glucose levels comparable to that of patch-treated euglycemic rats. This result verified the glucose-responsive delivery of glucagon from composite MN patches in vivo.

Figure 20:
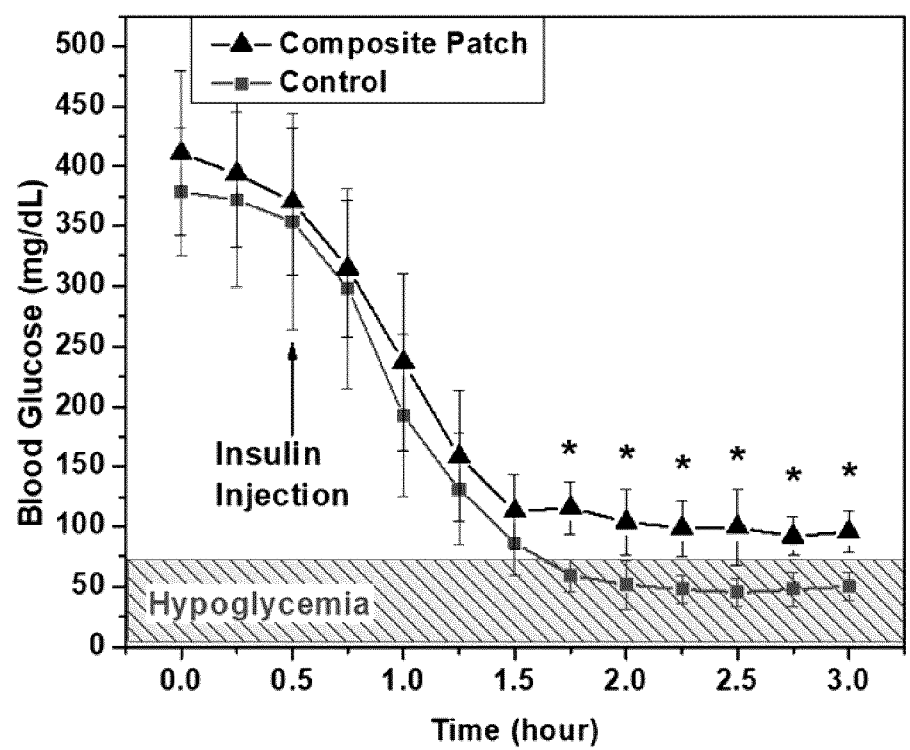
FIG. 20 is a graph illustrating the hypoglycemia prevention (efficacy) studies of T1D rats, treated with composite MN patch and sham device, subjected to a high dose of insulin (2 IU/kg). An asterisk (*) indicates a statistically significant difference (p<0.05) between treatment and control group at the specified time point.
Figure 21:
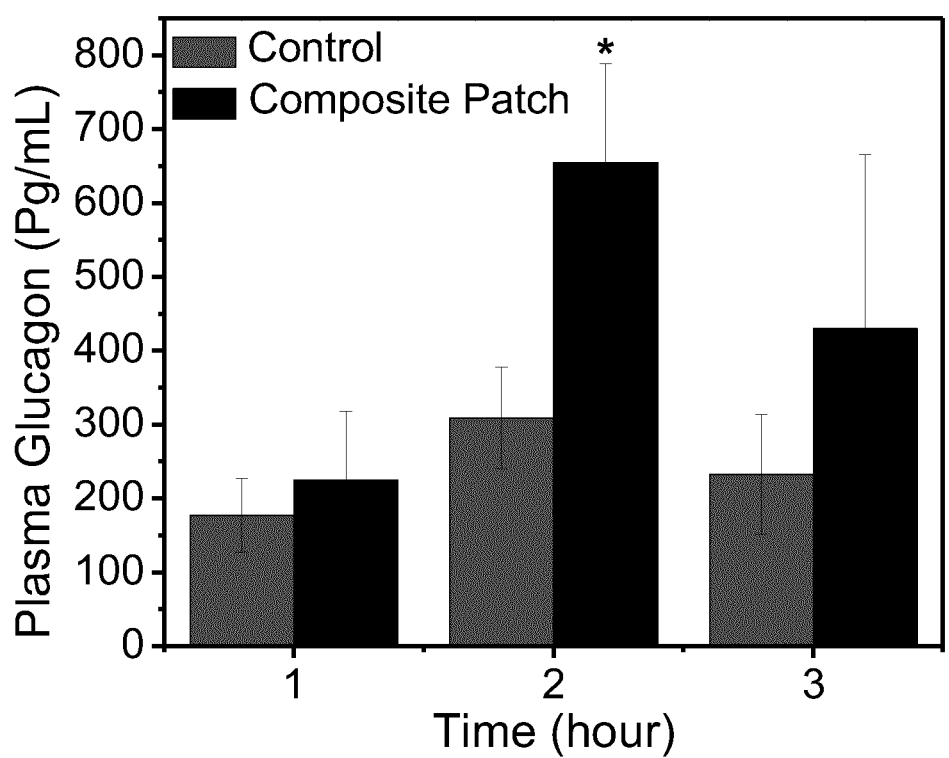
FIG. 21 is a graph illustrating the plasma glucagon concentrations in treated rats vs untreated rats measured by radioimmunoassay (RIA). An asterisk (*) indicates a statistically significant difference (p<0.05) between treatment and control group at the specified time point.

The ability of the composite MN patch to prevent hypoglycemia in T1D rats was studied over a span of 3 hours. Glucagon-loaded composite patches (or sham devices) were applied to the shaven skin of rats at the start of the experiment (t=0 min) and 2 IU/kg of insulin was administered subcutaneously to each rat at t=30 min to induce hypoglycemia. It was found that the glucagon-loaded composite patch successfully prevented the appearance of hypoglycemia for at least 2.5 hours post-insulin administration (FIG. 20). The composite patch system was able to consistently maintain BGLs above 90 mg/dL—well above the hypoglycemic threshold of 70 mg/dL. In contrast, the BGLs in sham-treated rats fell to hypoglycemia (<70 mg/dL) beginning at 75 minutes post-insulin administration and then below 50 mg/dL around 105 minutes post-insulin, which can be considered borderline severe hypoglycemia. BGLs collected from t=105 min onwards in composite patch-treated rats were all significantly higher (p 0.001) than BGLs in sham-treated rats. In addition to tracking BGLs, plasma glucagon levels were also obtained for each hour of the experiment and were measured by radioimmunoassay (RIA glucagon, EMD Millipore) (Bak et al., 2014). As shown in FIG. 21, composite patch-treated rats exhibited higher plasma glucagon levels than sham-treated rats for all three hours. Plasma glucagon levels reached a maximum of 644±115 pg/mL in patch-treated rats compared to 265±55 pg/mL for sham-treated rats at the 2-hour time point (statistically significant; p=0.016) since this is around the time of insulin's greatest effect which also corresponds to low BGLs. Taken together, this result further reinforces that glucagon release from the composite patch was indeed responsive to low blood glucose levels and hypoglycemia can be prevented using the composite MN patch system.

Example 7

Figure 22:
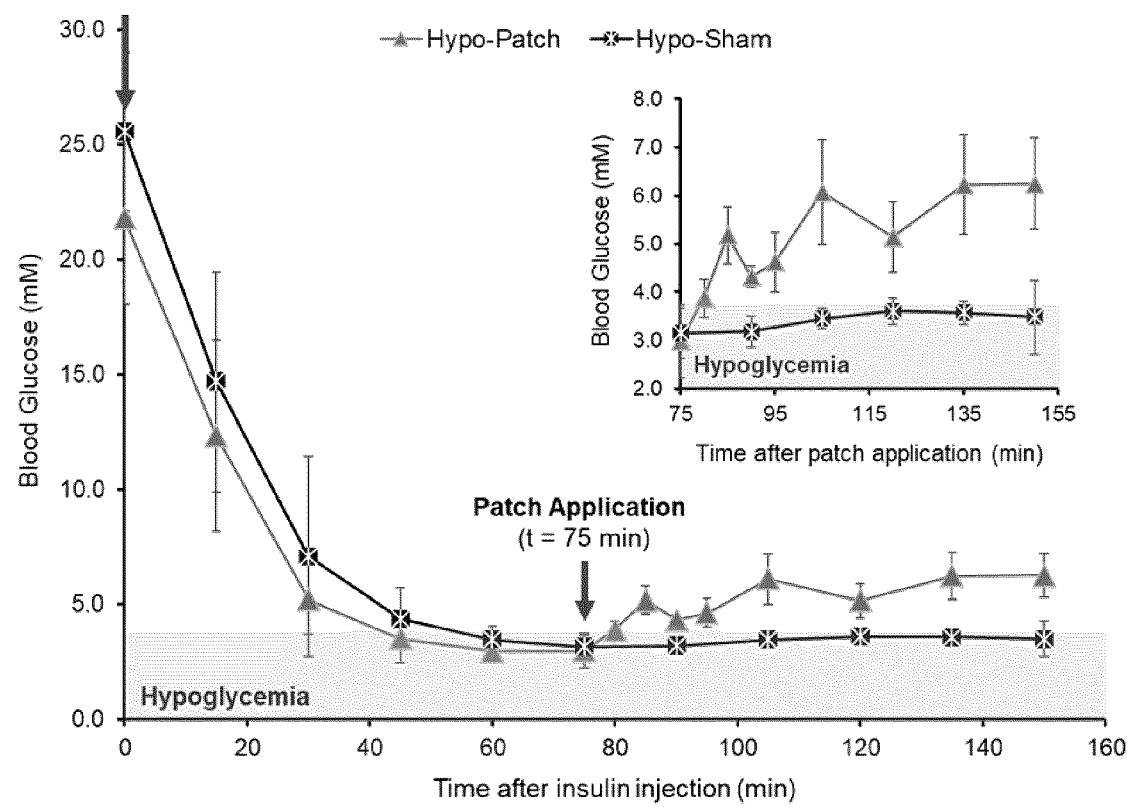
FIG. 22 is a graph illustrating efficacy of the composite glucagon patch against insulin-induced hypoglycemia on type 1 diabetic rats (n=4). High-dose insulin was injected S.C. at t=0 min, composite glucagon patch was applied at t=75 min. Hypoglycemia cut-off is defined as ≤3.9 mM. Inset: enhanced view of the rise in blood glucose immediately following the application of composite glucagon patches on hypoglycemic T1D rats.

Heat-Stable Composite Microneedle Patch for the Delivery of Unstable Polypeptide Therapeutics
Materials and Methods
Composite microneedles were prepared by casting a mixture of glucagon-loaded glucose responsive microgels and PMVE-MA-PEG polymer solution into a silicone replication mold. After several cycles of applying additional polymer layers and drying in a 40° C. oven overnight, the composite microneedle patch was removed from the mold and crosslinked (cured) in an 80° C. oven. Preliminary characterization of the PMVE-MA-PEG+glucagon-ABA composite microneedle patches were performed for the evaluation of morphology, skin penetration, and in vivo bioactivity in a type 1 diabetic (T1D) rat model as described in example 6. In brief, the composite microneedles were evaluated for in vivo efficacy in a streptozotocin (STZ)-induced type 1 diabetic (T1 D) rat model. As depicted in FIG. 22, all rats were fasted for 4 hours, shaved, and were given a subcutaneous (SC) injection of high dose (2 IU/kg) insulin at t=0 min to induce hypoglycemia. Treatment (composite patch or vehicle) was applied on the rats at t=75 min and blood glucose was tracked by a glucose monitor throughout the entire study (2.5 hours). Hypoglycemic rats given sham (vehicle) treatment saw a minimal blood glucose rise of 0.3±0.8 mM by the end of the study and remained in the hypoglycemic state towards the end of the study. In contrast, hypoglycemic rats given the composite patch saw a blood glucose rise of 3.3±0.9 mM by the end of the study.
Results
As shown in the inset of FIG. 22, the hypoglycemic rats were successfully rescued from hypoglycemia just 10 minutes after composite patch application and stayed in the euglycemic range until the end the of the study. The findings clearly demonstrate that the PMVE-MA-PEG+glucagon-ABA composite microneedle patch was able to preserve glucagon bioactivity even after exposure to high temperatures during the fabrication process, which reinforces the hypothesis that the zwitterionic ABA-based microgels can stabilize and preserve the bioactivity of glucagon.

Example 8

Figure 23:
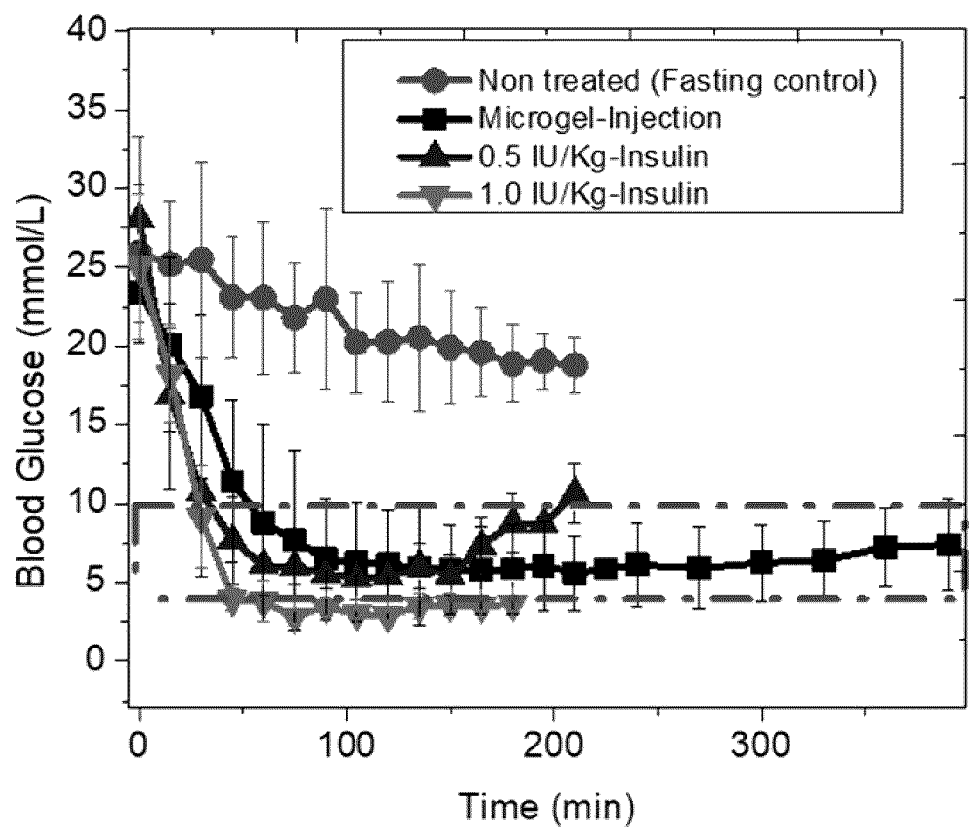
FIG. 23 is a graph illustrating results of antidiabetic tests of glucose responsive microgel vs control groups in diabetic rats.

Antidiabetic Effect on Type 1 Diabetic Rats Upon Microgel Injection
Materials and Methods
Male Sprague Dawley rats (Charles River) were treated with 65 mg/kg streptozotocin (STZ) to induce type 1 diabetes. The rats receiving STZ were carefully monitored for 1 week during which time the blood sugar was measured in 2 day intervals using a glucose meter (OneTouch® Ultra®, LifeScan, Inc., USA). Diabetic rats with blood sugar stabilized above 17 mmol/L were selected for the study. All rats were fasted for 4 hours prior to the experiment to eliminate the possible confounding effect of food (BERNICE FRIEDMANN, 1965). The blood glucose levels of the diabetic rats were monitored every 15 minutes throughout the experiment. The primary treatment group consisted of diabetic rats given an S.C. injection of 25 mg/ml of the glucose-responsive microgels, while the comparative treatment group consisted of rats injected S.C. with 0.5 or 1 IU/kg dose of human recombinant insulin, and the control group consisted of non-treated diabetic rats (fasting control). The blood glucose levels were measured every 15 min after injection and stopped whenever they were above/bellow euglycemia threshold.
Results
As shown in FIG. 23, the blood glucose in treated groups decreased significantly in comparison to the non-treated fasting group. Blood glucose decreased to euglycemia in rats treated with 0.5 IU/kg insulin and then rapidly increased back to hyperglycemia after 3 h. In contrast, blood glucose in rats given the 1 IU/kg insulin rapidly fell to euglycemia by 45 minutes post-injection and then fell even further below the hypoglycemic threshold towards severe hypoglycemic levels. The rats treated with glucose-responsive microgels experienced a slight delay in glucose reduction, but eventually reached euglycemia at 60 minutes post-injection, and was able to maintain euglycemia for at least another 6 hours. Compared to insulin, the introduced glucose-responsive microgels showed a longer duration of efficacy in regulating the blood glucose of diabetic rats. It is also worth noting that rats given the glucose-responsive microgels did not experience hypoglycemia at any time, which was in stark contrast to rats administered the 1 IU/kg dose of insulin.

We claim:
1. A composition for blocking or treating hypoglycemia comprising:
    a microgel comprising crosslinked polymers containing glucose-responsive moieties; and
    a blood glucose-raising therapeutic agent loaded on or within the microgel,
    wherein the microgel further comprises a stabilizing component for the blood glucose-raising therapeutic agent,
    wherein the stabilizing component is zwitterionic-based polymers, and the blood glucose-raising therapeutic agent is native glucagon.
2. The composition of claim 1 wherein polymers containing the glucose-responsive moieties form secondary cross-links in response to low glucose level, thereby causing shrinking of the microgel and rapid release of the blood glucose-raising therapeutic agent.

3. The composition of claim 1 wherein the glucose-responsive moieties are any one or a combination of a boronic acid-containing compound, glucose oxidase, and lectin.

4. The composition of claim 3 wherein the boronic acid-containing compound is a polymer containing any one or a combination of 4-mercaptophenylboronic acid, phenylboronic acid, 3-alkylamidophenylboronic acid, 4-carboxyphenylboronic acid, 4-acetamido-3-fluorophenylboronic acid, 2-hydroxymethylphenylboronic acid, 4-nitrophenylboronic acid, 3-acetamido-6-heptafluoropropylphenylboronic acid, 4-vinylphenylboronic acid, 3-acrylamidophenylboronic acid, 4-(1,6-dioxo-2,5-diaza-7-oxamyl)phenylboronic acid, 2-dimethylaminomethyl-5-vinylphenylboronic acid, 4-(N-allylsulfamoyl) phenylboronic acid, 4-(3-butenylsulfonyl)phenylboronic acid and 4-acrylamido-3-fluorophenylboronic acid (AFBA).

5. The composition of claim 3, wherein the boronic acid-containing compound is AFBA.

6. The composition of claim 3 wherein the lectin is Concanavalin A.

7. The composition of claim 1, wherein the stabilizing component protects the therapeutic agent during loading onto and release from the microgels, and during the manufacturing of a device having the microgels embedded or integrated, and storage and clinical applications of the device.

8. The composition of claim 1 wherein the stabilizing component stabilizes the native structure and bioactivity of the therapeutic agent.

9. The composition of claim 1 wherein the zwitterionic-based polymers are polymers of N-(methacryloxypropyl)-N, N-dimethyl-N-(3-sulfopropyl) ammonium betaine, and cationic carboxybetaine.

10. The composition of claim 1 wherein the zwitterionic-based polymers are zwitterionic polymers bearing carboxybetaine and sulfobetaine.

11. The composition of claim 1 further comprising a loading-assisting component selected from the group consisting of (2-carboxymethyl)-3 acrylamidopropyldimethylammonium bromide methyl ester, (4-carboxypropyl)-3-acrylamidopropyldimethylammonium bromide ethyl ester, (6-carboxypentyl)-3-acrylamidopropyldimethylammonium bromide ethyl ester, 3-acrylamido-N-(2-methoxy-2-oxoethyl)-N,N-dimethylpropan-1-aminium, 3-methacrylamido-N-(2-methoxy-2-oxoethyl)-N, N-dimethylpropan-1-aminium 2-Carboxy-N, N,-dimethyl-N-(2'-(methacryloyloxy) ethyl) ethanaminium inner salt and 3-[2-(Methacryloyloxy) ethyl]dimethylammonio]propionate.

12. The composition of claim 11 wherein the crosslinked polymer has an opposite ionic charge with respect to therapeutic agent at selected pH and is converted to zwitterionic form after hydrolysis.

13. The composition of claim 1 wherein the therapeutic agent regulates hypoglycemia.

14. The composition of claim 1 wherein monomer units in the crosslinked polymers are crosslinked with physical or chemical linkages that are biodegradable or non-degradable.

15. The composition of claim 14 wherein the cross-linkages are selected from group of N,N'-Methylenbisacrylamide, dimethylsubermidate, glutaraldehyde, N,N-ethylene-bis (iodoacetamide), ethylene glycol dimethacrylate, poly(ε-caprolactone) diacrylate, polylactide diacrylate, polylactide dimethacrylate, poly(lactide-co-glycolide) diacrylate, poly(lactide-co-glycolide) dimethacrylate, poly(ε-caprolactone-b-ethylene glycol-b-ε-caprolactone) diacrylate, glycol-b-(lactide-co-glycolide)] dimethacrylate, and polymerizable compounds containing disulfide bonds, peptide bonds, or ester bonds.

16. The composition of claim 1, wherein monomer units in the crosslinked polymers are crosslinked with N,N'-methylenebisacrylamide.

17. The composition of claim 1, wherein the microgel is a multifunctional microgel having a particle size of about 20 nm to 1000 μm.

18. The composition of claim 1 wherein the blood glucose-raising therapeutic agent is loaded by:
dissolving, dispersing, entrapping, or encapsulating within, or attachment on the glucose-responsive microgels.

* * * * *